US005999977A

United States Patent [19]
Riddle

[11] Patent Number: 5,999,977
[45] **Date of Patent: *Dec. 7, 1999**

[54] SYSTEM FOR TERMINATING MULTICAST CHANNEL AND DATA BROADCAST WHEN AT LEAST TWO SECOND ENDPOINTS DO NOT TRANSMIT POSITIVE ACKNOWLEDGMENT MESSAGE TO FIRST ENDPONT

[75] Inventor: Guy G. Riddle, Los Gatos, Calif.

[73] Assignee: Apple Computer, Inc., Cupertino, Calif.

[ * ] Notice: This patent is subject to a terminal disclaimer.

[21] Appl. No.: 08/987,332

[22] Filed: Dec. 9, 1997

Related U.S. Application Data

[63] Continuation of application No. 08/468,715, Jun. 5, 1995, abandoned, which is a continuation of application No. 08/396,198, Feb. 24, 1995, Pat. No. 5,854,898.

[51] Int. Cl.$^6$ ..................................................... G06F 15/16
[52] U.S. Cl. .......................... 709/227; 709/204; 709/231; 709/237; 709/228
[58] Field of Search ......................... 395/200.57, 200.34, 395/200.58, 200.61, 200.67; 709/227, 204, 231, 237, 228; 399/202

[56] References Cited

U.S. PATENT DOCUMENTS

| | | | |
|---|---|---|---|
| 4,507,781 | 3/1985 | Alvarez, III et al. | 370/95.3 |
| 4,756,019 | 7/1988 | Szybicki | 379/112 |
| 4,760,572 | 7/1988 | Tomikawa | 370/390 |
| 4,893,326 | 1/1990 | Duran et al. | 379/53 |
| 5,077,732 | 12/1991 | Fischer et al. | 370/437 |
| 5,099,510 | 3/1992 | Blinken, Jr. et al. | 379/202 |
| 5,101,451 | 3/1992 | Ash et al. | 379/221 |

(List continued on next page.)

FOREIGN PATENT DOCUMENTS

| | | |
|---|---|---|
| 2080530 | 4/1994 | Canada . |
| 0279232 | 8/1988 | European Pat. Off. . |

OTHER PUBLICATIONS

PCT International Search Report (PCT/US96/02459) mailed Aug. 7, 1996.

Mon–Song Chen, et al., "Designing a Distributed Collaborative Environment," *Communication for Global Users, including a Communications Theory Mini Conference*, Orlando, Dec. 6–9, 1992, Insitute of Electrical and Electronics Engineers, pp. 219–219.

W.H. Leung, et al., "Multimedia Conferencing Capabilities in an Experimental Fast Packet Network," *Proceedings of the International Switching Symposium*, Yokohama, Oct. 25, 1992, Institute of Electronics, Information and Communication Engineers, pp. 258–262.

(List continued on next page.)

*Primary Examiner*—Thomas C. Lee
*Assistant Examiner*—Ilwoo Park
*Attorney, Agent, or Firm*—Blakely, Sokoloff, Taylor & Zafman

[57] ABSTRACT

A method and apparatus for optimizing transmission of data to a plurality of second endpoints in a system wherein a first endpoint is providing data to the plurality of second endpoints each connected by a point-to-point communication channels. This may be useful in teleconferencing applications with a plurality of participants (endpoints) or broadcast server applications. The first endpoint activates a multicast communication channel having a first multicast address and commences broadcast of the data over the multicast communication channel. The first endpoint transmits a request message to each of the plurality of second endpoints in order to query each of the second endpoints whether they can receive transmissions broadcast to the first multicast address. Certain of the plurality of second endpoints transmit an acknowledgment message if they can receive transmissions broadcast to the first multicast address, and the first endpoint receives the acknowledgment message. Then, for each acknowledgment message received from certain of the plurality of second endpoints, the first endpoint deactivates the point-to-point communication channel and the certain of the plurality of second endpoints.

15 Claims, 27 Drawing Sheets

U.S. PATENT DOCUMENTS

| | | | |
|---|---|---|---|
| 5,136,581 | 8/1992 | Muehrcke | 370/62 |
| 5,157,662 | 10/1992 | Tadamura et al. | 370/352 |
| 5,195,086 | 3/1993 | Baumgartner et al. | 370/62 |
| 5,200,951 | 4/1993 | Grau et al. | 370/62 |
| 5,241,625 | 8/1993 | Epard et al. | 395/163 |
| 5,276,679 | 1/1994 | McKay et al. | 370/358 |
| 5,291,492 | 3/1994 | Andrews et al. | 370/110.1 |
| 5,297,143 | 3/1994 | Fridrich et al. | 370/85.3 |
| 5,309,433 | 5/1994 | Cidon et al. | 370/60 |
| 5,311,585 | 5/1994 | Armstrong et al. | 379/221 |
| 5,315,586 | 5/1994 | Charvillat | 370/60 |
| 5,323,445 | 6/1994 | Nakatsuka | 348/15 |
| 5,341,374 | 8/1994 | Lewen et al. | 370/85.4 |
| 5,355,371 | 10/1994 | Auerbach et al. | 370/60 |
| 5,371,534 | 12/1994 | Dagdeviren et al. | 348/14 |
| 5,373,549 | 12/1994 | Bales et al. | 379/93 |
| 5,374,952 | 12/1994 | Flohr | 348/12 |
| 5,375,068 | 12/1994 | Palmer et al. | 364/514 |
| 5,392,344 | 2/1995 | Ash et al. | 379/221 |
| 5,422,883 | 6/1995 | Hauris et al. | 370/62 |
| 5,422,942 | 6/1995 | Kakwashima | 379/212 |
| 5,440,624 | 8/1995 | Schoof, II | 379/202 |
| 5,442,749 | 8/1995 | Northcutt et al. | 395/200.09 |
| 5,453,780 | 9/1995 | Chen et al. | 348/15 |
| 5,455,826 | 10/1995 | Özveren et al. | 370/232 |
| 5,459,725 | 10/1995 | Bodner et al. | 370/60 |
| 5,473,679 | 12/1995 | La Porta et al. | 379/201 |
| 5,475,746 | 12/1995 | Miller et al. | 379/201 |
| 5,483,587 | 1/1996 | Hogan et al. | 379/202 |
| 5,483,588 | 1/1996 | Eaton et al. | 379/202 |
| 5,491,798 | 2/1996 | Bonsall et al. | 395/200.04 |
| 5,509,010 | 4/1996 | La Porta et al. | 370/397 |
| 5,511,168 | 4/1996 | Perlman et al. | 395/200.15 |
| 5,541,927 | 7/1996 | Kristol et al. | 370/94.2 |
| 5,557,724 | 9/1996 | Sampat et al. | 395/157 |
| 5,572,582 | 11/1996 | Riddle | 379/202 |

OTHER PUBLICATIONS

C. Kim et al., "Performance of Call Splitting Algorithms for Multicast Traffic," INFOCOM '90, pp. 348–356 (1990).

J. Ott et al., "Multicasting the ITU MCS: Integrating Point––to–Point abd Multicast Transport" Singapore *ICCS*, pp. 1013–1017 (1994).

R. bubenik et al., "Multipoint Connection Management in High Speed Networks," INFOCOM '91, pp. 59–67 (1991).

"Dynamic Conference Call Participation" IBM Technical Disclosure Bulletin, V. 28, Aug. 1995, pp. 1135–1138.

"Control of Video Telephony from a Data Conferencing System", IBM Technical Disclosure Bulletin, v. 37, Oct. 1994, pp. 327–332.

"Intelligent Packet Relay in Distributed Multimedia Systems", IBM Technical Disclosure Bulletin, v. 37, Jul. 1994, pp. 211–214.

FIG_2

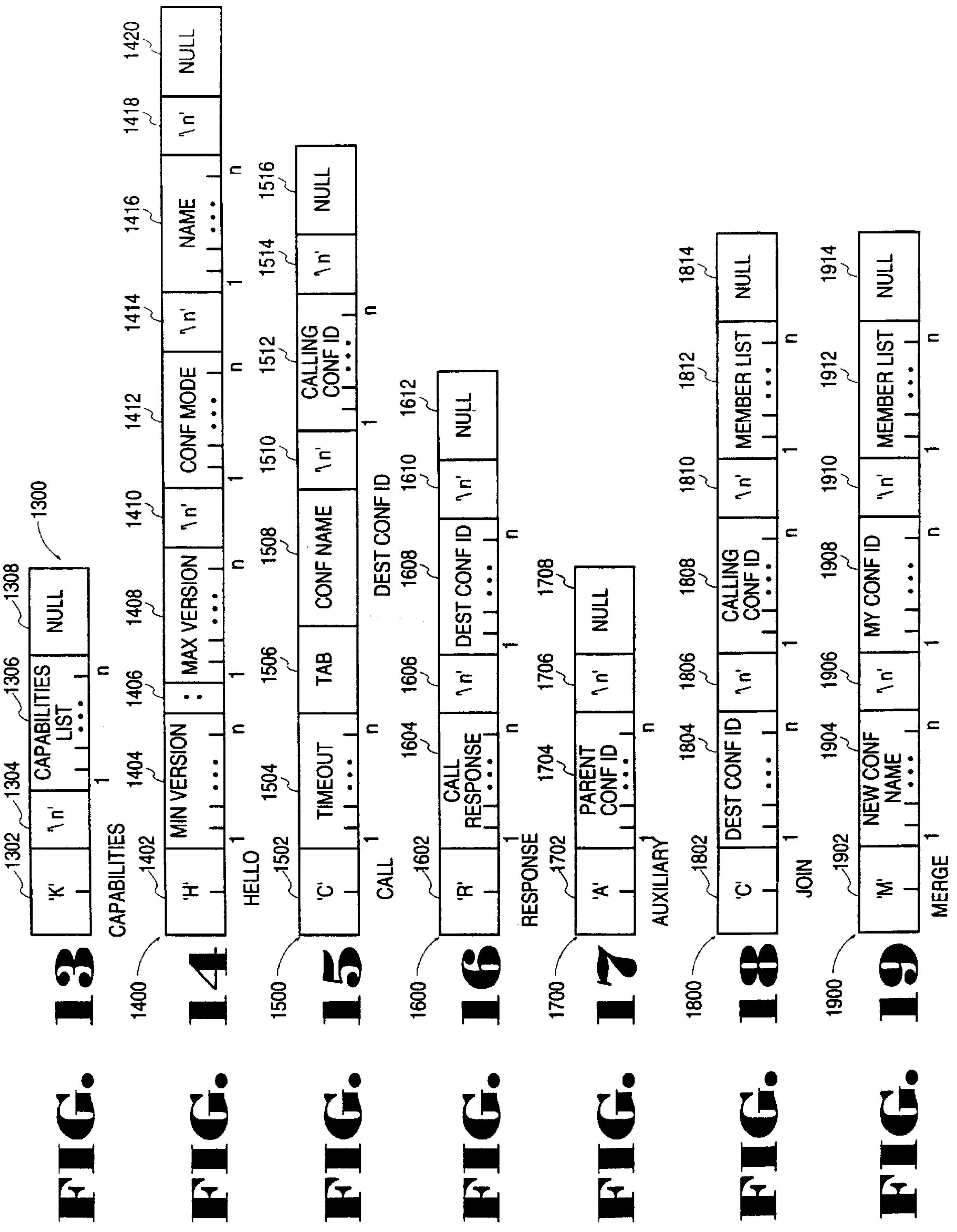
FIG. 13
1300
1302 1304 1306 1308
'K' '\n' CAPABILITIES LIST NULL
CAPABILITIES
FIG. 14
1400
1402 1404 1406 1408 1410 1412 1414 1416 1418 1420
'H' MIN VERSION : MAX VERSION '\n' CONF MODE '\n' NAME '\n' NULL
HELLO
FIG. 15
1500
1502 1504 1506 1508 1510 1512 1514 1516
'C' TIMEOUT TAB CONF NAME '\n' CALLING CONF ID '\n' NULL
CALL
DEST CONF ID
FIG. 16
1600
1602 1604 1606 1608 1610 1612
'R' CALL RESPONSE '\n' DEST CONF ID '\n' NULL
RESPONSE
FIG. 17
1700
1702 1704 1706 1708
'A' PARENT CONF ID '\n' NULL
AUXILIARY
FIG. 18
1800
1802 1804 1806 1808 1810 1812 1814
'C' DEST CONF ID '\n' CALLING CONF ID '\n' MEMBER LIST NULL
JOIN
FIG. 19
1900
1902 1904 1906 1908 1910 1912 1914
'M' NEW CONF NAME '\n' MY CONF ID '\n' MEMBER LIST NULL
MERGE Merge Conf $D_2$ into $D_1$

SYSTEM FOR TERMINATING MULTICAST CHANNEL AND DATA BROADCAST WHEN AT LEAST TWO SECOND ENDPOINTS DO NOT TRANSMIT POSITIVE ACKNOWLEDGMENT MESSAGE TO FIRST ENDPONT

This is a continuation of U.S. patent application Ser. No. 08/468,715, now abandoned, filed Jun. 5, 1995, which is a continuation of U.S. patent application Ser. No. 08/396,198, filed Feb. 24, 1995, now U.S. Pat. No. 5,854,898 issued Dec. 29, 1998.

BACKGROUND OF THE INVENTION

1. Field of the Invention

The present invention relates to teleconferencing systems.

More specifically, the present invention relates to the addition of a data stream, such as an auxiliary data stream to a teleconference.

2. Background Information

Teleconferencing is increasingly becoming a popular application in personal computer systems. Such applications typically allow the transfer of audio and video data between users so that they can speak and otherwise communicate with one another. Such applications sometimes also include data sharing wherein various types of data such as documents, spreadsheets, graphic data, or other types of data, can be shared and manipulated by all participants in the teleconference. Different teleconference applications perhaps residing on different hardware platforms have different capabilities. Moreover, a wide variety of features has been implemented in different teleconference applications, and the proliferation of different types of computer systems with different capacities, and different networking media has created challenges for teleconferencing.

For example, for most teleconferencing applications, it is assumed that the sender and the receiver have certain minimum capabilities. However, with the wide diversity of systems having different computation capacities, and in addition, the wide variety of networking media, that certain systems may not have certain capabilities. For example, the first system may be a high performance workstation coupled to a high performance communication medium whereas a second system may employ an earlier generation processor, operate at a substantially slower clock rate, and/or be coupled to a lower capacity communication medium. Certain network capabilities such as multicast or other optimization features, may not be present in certain networking media. Thus, in order for some teleconference applications to function, the participants in the conference can only operate at the fastest possible configuration provided by any minimum system which may participate in the teleconference. Of course, this results in certain inefficiencies, especially if both of the participants are capable of transmitting in a higher capacity than the system with the least possible capability.

Another issue in teleconference applications is the ability of certain stations to participate in more than one teleconference. In fact, in certain circumstances, multiple individual conferences may be desired to be merged by a user according to operating circumstances. Due to the distributed nature of certain networks, during this merge operation, certain circumstances may change. That is, that while a single station is merging more than one conference it is participating in, a second station at a remote location may further have other operating circumstances changing (e.g., participants leaving, entering, or otherwise joining an on-going teleconference), and thus, the management of such merging operations becomes unduly burdensome.

Yet another shortcoming of certain prior art teleconference applications is the ability to associate an independent data stream with an on-going teleconference. For example, a source participant may desire to provide an additional data stream to other participants in a teleconference. This additional source may include, but not be limited to, video, data, audio or any other type of data available to the source participant. For example, such an additional source may include other audio information for a receiver. Other types of data may also be desired to be associated with an on-going teleconference, which may be accessible to other participant in the teleconference. Certain prior art teleconferencing applications lack these abilities.

SUMMARY

A method and apparatus for optimizing transmission of data to a plurality of second endpoints in a system wherein a first endpoint is providing data to the plurality of second endpoints each connected by point-to-point communication channels. This may be useful in teleconferencing applications with a plurality of participants (endpoints) or broadcast server applications. The first endpoint activates a multicast communication channel having a first multicast address and commences broadcast of the data over the multicast communication channel. The first endpoint transmits a request message to each of the plurality of second endpoints in order to query each of the second endpoints whether they can receive transmissions broadcast to the first multicast address. Certain of the plurality of second endpoints transmit an acknowledgement message if they can receive transmissions broadcast to the first multicast address, and the first endpoint receives the acknowledgement message. Then, for each acknowledgement message received from certain of the plurality of second endpoints, the first endpoint deactivates the point-to-point communication channel and the certain of the plurality of second endpoints.

The broadcast of the data and the multicast communication channel is terminated if at least two of the plurality of second endpoints do not transmit the acknowledgement messages containing a positive acknowledgement. In this instance, communication channels are maintained as point-to-point. Subsequent to commencing broadcast of the data to the multicast address, the first endpoint can receive detach messages from certain of the plurality of second endpoints, and if at least two of the plurality of second endpoints are not receiving the data, then the first endpoint can terminate the broadcast of the data and the multicast communication channel. Communication of the data in this instance also reverts to point-to-point communication channels.

In implemented embodiments, the acknowledgement message includes a response code which indicates whether the second endpoint can receive transmissions broadcast to the first multicast address. Also, in implemented embodiments, prior to the first endpoint activating the multicast communication channel having the first multicast address, it is determined whether the single communication medium supports broadcasting to the first multicast address, and if not, multicast cannot be activated.

BRIEF DESCRIPTION OF THE DRAWINGS

The present invention is illustrated by way of example and not limitation in the figures of the accompanying in which like references indicate similar elements and in which:

FIGS. 13–25 show details of the messages transmitted between endpoints during various teleconferencing applications.

DETAILED DESCRIPTION

The present invention relates to networking systems, more specifically, the present invention describes a messaging protocol for establishing and maintaining teleconference connections between a plurality of participants in a networking system. Applications for this include, transmitting application and/or system capabilities between participants or potential participants in a teleconference, notifying participants of a teleconference that more than one teleconference should be merged, and addition of an auxiliary data stream to an on-going teleconference. Although the present invention will be described with reference to certain specific embodiments thereof, especially, with relation to certain hardware configurations, data structures, packets, method steps, and other specific details, these should not be viewed as limiting the present invention. Various modifications and other may be made by one skilled in the art, without departing from the overall spirit and scope of the present invention.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright Apple Computer, Inc.

Figure 1:
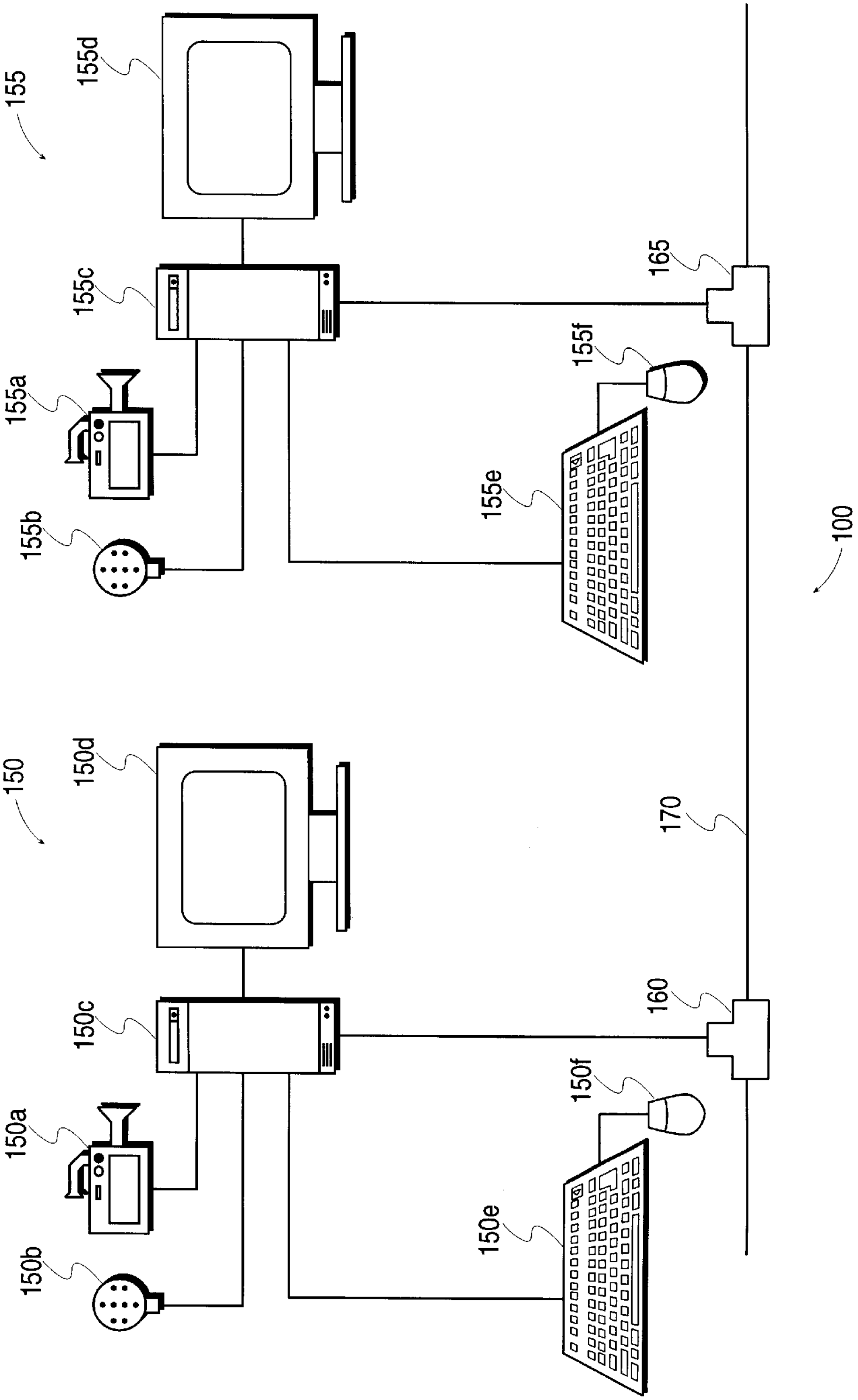
FIG. 1 illustrates an example configuration in which various embodiments of the present invention may be implemented.

A typical system configuration in which a teleconference may take place is illustrated as 100 in FIG. 1. For example, a first workstation 150 may communicate via teleconference with a second workstation 155, as illustrated. System 150 may include a central processing unit 150*c* which is coupled to a display 150*d* a video input device 150*a*, and a sound input device 150*b*. The system 150 may communicate with over system 155 over networking medium 170 via network connection module 160. 160 may include any number of network adapters commercially available such as using Ethernet, Token Ring, or any other networking standard commercially available. Note that network adapter 160 may also include a wireless network adapter which allows transmission of data between components without a medium 170. Communication is thus provided via network adapter 165 coupled to system 155, and bi-directional communications may be established between two systems. System 150 further has a keyboard 150*e* and a pointing device 150*f*, such as a mouse, track ball, or other device for allowing user selections and user input.

Figure 2:
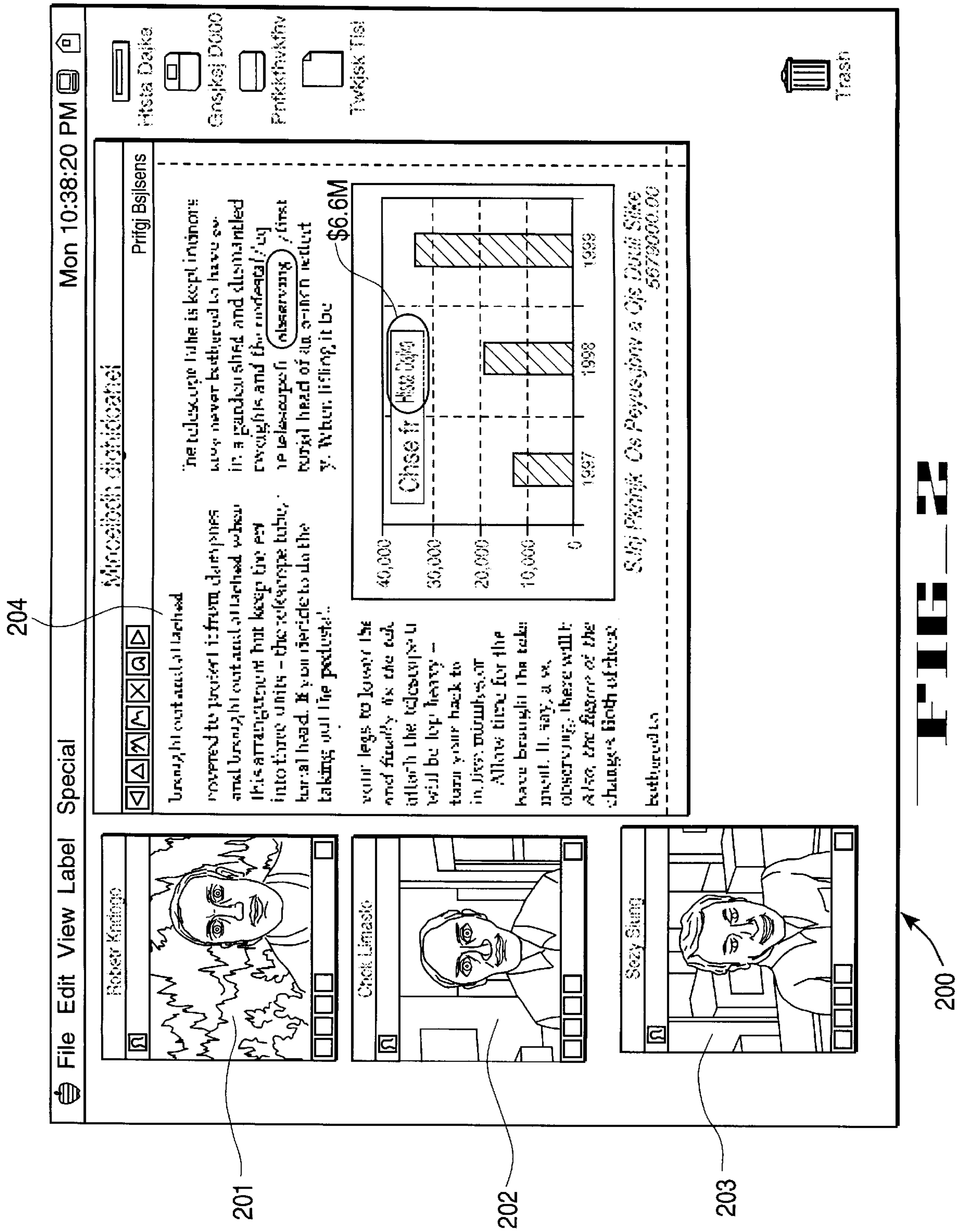
FIG. 2 shows a typical teleconferencing display which has both media and non-media sources displayed during the course of the teleconference.

A teleconference display is shown at 200 at FIG. 2. In implemented embodiments of the present invention, there is a source window, such as 201, showing a monitor of the local media source, and there are other media windows, such as 202 or 203 for each other user with which a participant is having communication. In the illustrated example, each of the windows 201–203 provides media information, that is, real-time audio and/or video information for bi-directional teleconferencing. In alternate embodiments of the present invention, non-media information such as 204 may also be displayed within the teleconferencing display. As will become apparent in the description below, in addition to media and non-media information, messaging information may also be transmitted between stations. In addition, an auxiliary media source (e.g. audio or video information) may be transmitted with a specified conference. The details of this will be discussed in more detail below.

In implemented embodiments of the present invention, a general purpose computer system is used for implementing the teleconferencing applications and associated processes to be described here. Although certain of the concepts to be described here will be discussed with reference to teleconferencing, it is apparent that the methods and associated apparatus can be implemented for other applications, such as file sharing, real time data acquisition, or other types of applications which sends data from a first participant to a second participant or set of participants. A computer system such as that used for implementing embodiments of the present invention will now be described.

Figure 3:
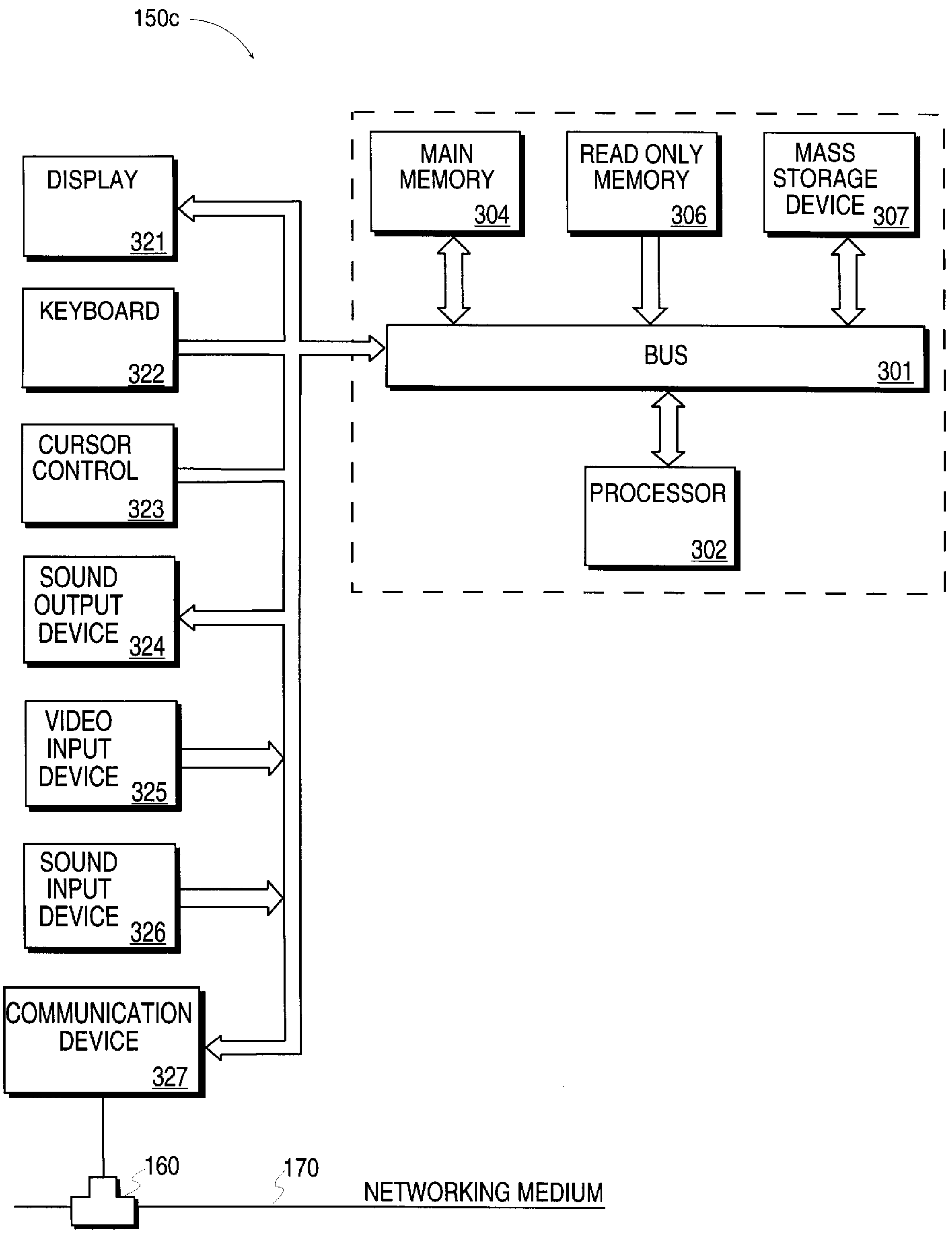
FIG. 3 shows a single system in which embodiments of the present invention may be implemented.

A computer system, such as a workstation, personal computer or other processing apparatus 150*c* or 155*c* as shown in FIG. 1 is illustrated in more detail in FIG. 3. 150*c* comprises a bus or other communication means 301 for communicating information, and a processing means 302 coupled with bus 301 for processing information. System

150*c* further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. Included in memory 304 during run-time may be the conference component module which operates according to the communication protocols to be described below. System 150*c* also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions.

System 150*c* may further be coupled to a display device adapter display 321 such as a cathode ray tube (CRT) or liquid crystal display (LCD) coupled to bus 301 for displaying information to a computer user. Such a display 321 may further be coupled to bus 301 for the receipt of video or image information. An alphanumeric input device 322, including alphanumeric and other keys may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321. For teleconferencing applications, system 150*c* may also have coupled to it a sound output device 324, a video input device 325, and sound input device 326, along with the associated D/A (Digital-to-Analog) and A/D (Analog-to-Digital) converters for inputting or outputting media signal bitstreams. System 150*c* may further be coupled to communication device 327 which is coupled to network adapter 160 for communicating with other teleconferencing stations.

Note, also, that any or all of the components of system 150*c* and associated hardware may be used in various embodiments, however, it can be appreciated that any configuration of the system may be used for various purposes according to the particular implementation.

In one embodiment, system 150*c* is one of the Apple Computer® brand family of personal computers such as the Macintosh 8100 brand personal computer manufactured by Apple Computer, Inc. of Cupertino, Calif. Processor 302 may be one of the PowerPC brand microprocessors manufactured by Motorola, Inc. of Schaumburg, Ill.

Note that the following discussion of various embodiments discussed herein will refer specifically to a series of routines which are generated in a high-level programming language (e.g., the C or C++ programming language) and compiled, linked, and then run as object code in system 150*c* during run-time within main memory 304 by processor 302. For example the object code may be generated by the C++ Compiler available from Symantec, Inc. of Cupertino, Calif.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
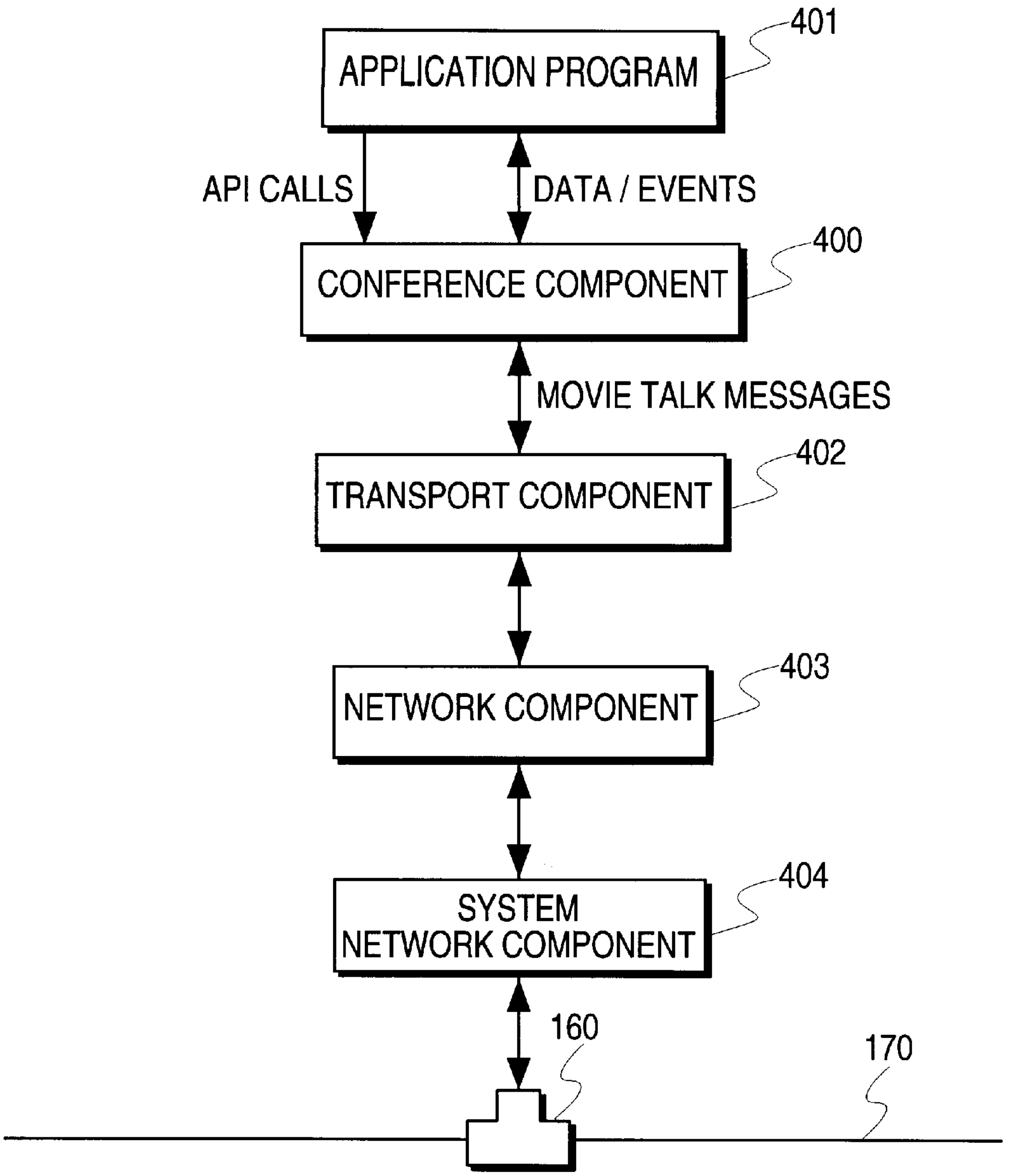
FIG. 4 shows an example architecture of a system employing various embodiments of the present invention.

FIG. 4 illustrates a plurality of processes and/or apparatus which may be operative within system 150*c*. At the highest level, for example, at the highest level in the ISO/OSI networking model, an application program 401, such as a teleconferencing application, an audio/video server, or a data server, communicates with conference component process 400 in the form of Application Program Interface (API) calls. The conference component 400 allows the application to establish communications between two or more teleconference stations. Control information, and media information can be transmitted between the first participant system and a second participant system. The conference component will be shown in more detail in FIG. 5. Conference component 400 communicates with the transport component 402 by sending MovieTalk messages for other teleconferencing stations which are encapsulated and placed into a form that the transport component 402, the network component 403, and the system network component 404 can packetize and transmit over networking medium 170. For the purposes of the remainder of this disclosure, certain of the MovieTalk API calls and MovieTalk messages which are transmitted between conference components in a teleconferencing system will be described in more detail.

The transport component 402 and the networking component 403 provide the necessary operations for communication over the particular type of network adapter 160 and networking medium 170 according to implementation. For example, networking component 402 may provide the TCP or ADSP protcols and packetizing, according to those respective standards.

Figure 5:
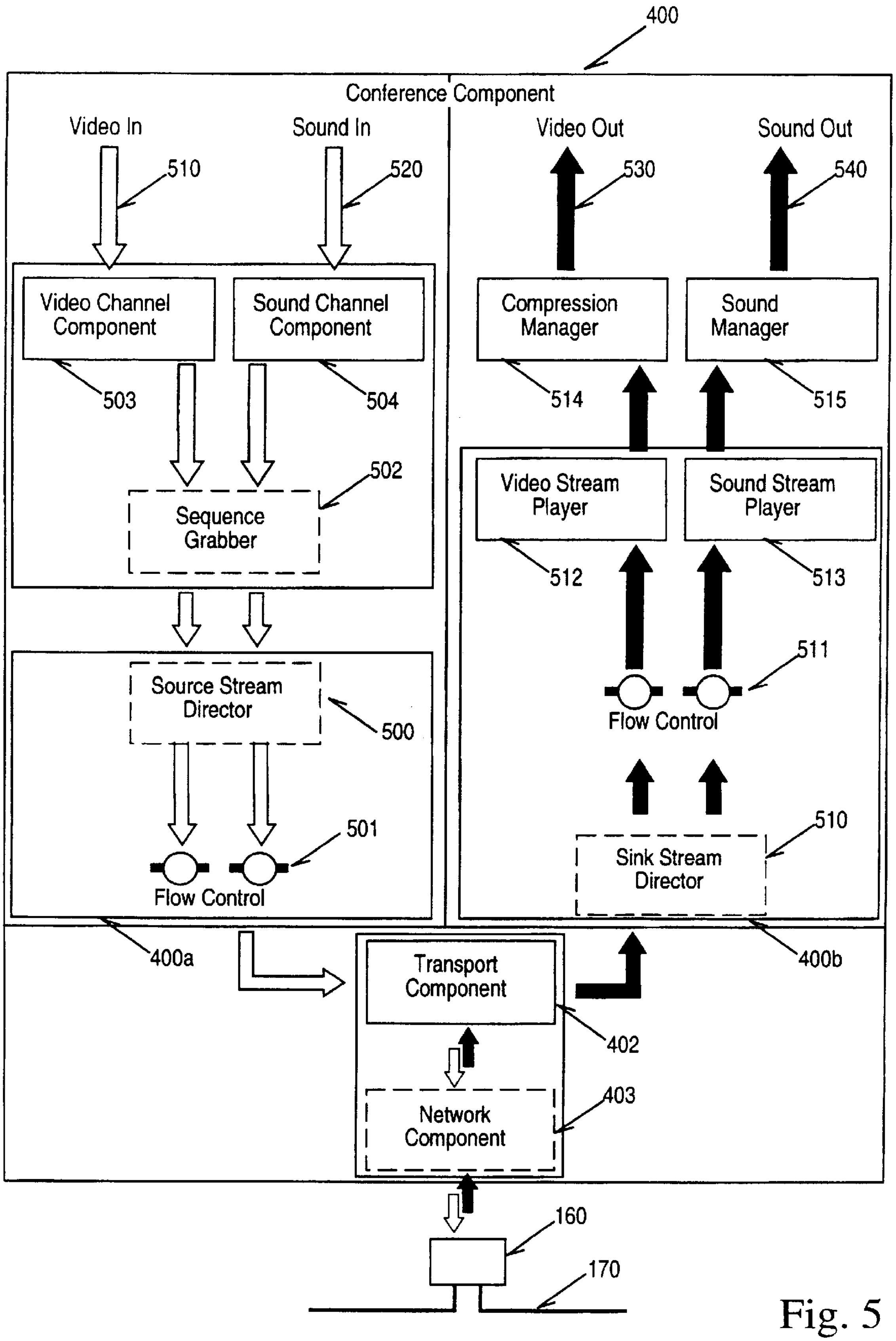
FIG. 5 shows a more detailed view of the conference component illustrated in FIG. 4.

A more detailed view of the conference component 400 is shown in FIG. 5. Specifically, the conference component 400 is shown in two portions 400*a* and 400*b* which show input and output portions of the conference component. Although illustrated as a separate transmitter and receiver, each conference component in the system has both capabilities, so that full bi-directional communication between conference components in respective participant teleconference systems in a network may communicate with one another. As illustrated, the input portion of the conference component 400*a* receives video and sound information over media input channels 510 and 520. The video channel component and sound channel component 504 present media data at regular intervals to sequence grabber 502. The real-time sound and video data (hereinafter referred to as "media data") are provided to a source stream director 500 from sequence grabber 502 which then provides the media messages to the transport component 402. Flow Control 501 then lets the video and sound data flow through at an implementation-dependent frequency. The video channel component 503, sound channel component 504, and sequence grabber 502 all are implemented using prior art products such as those commercially available (e.g., the QuickTime video channel, sound channel components, and sequence grabbers, available from Apple Computer, Inc. of Cupertino, Calif.) Flow control 501 may be implemented using known flow control apparatus and/or method as are commercially available, such as those which regulate flow based upon bandwidth, and other constraints in the source participant system. The conference component further comprises a sink stream director 510 which comprises a portion of the component 400*b* of the conference component for receipt of media data from transport component 402. Corresponding flow control 511, video and sound stream players 512 and 513, and compression and sound manager 514 and 515, for output of video streams 530 and 540, also form part of the conference component for full bi-directional conferencing capabilities.

The conference component's main function is to establish and maintain a bi-directional connection between every member of a conference. Conferencing applications use a pre-established control channel to exchange control data that is pertinent to the conference. This data might include user identification information or other information that is germane to the application's operation. Conferencing applications (e.g., 401) define the format and content of these control messages by establishing their own control protocols. The conferencing component further establishes communication channels between a first endpoint and a second endpoint, using the underlying transport component 402. Thus, once a media channel has been established, the conference component uses the transport component 402's media channel which is provided for transmission of media and non-media information. For the remainder of this application, however, the focus will be on the establishment of communication between a first and second participant (referred to as endpoints) or group of participants which may participate in a teleconference.

Application Program Interface (API)

The application program 401 controls the conference component 400 by the issuance of MovieTalk application API calls. The conference component operates using an event-driven model wherein events pertinent to the application are issued to the application program. The application program can then take appropriate action either by modifying internal data structures within (creating a source or sink), and/or issuance of appropriate messages over the network to other connected participants, or potential participants. According to messages received by the conference component, a current context and API calls from the application, the conference component can take appropriate action.

Figure 6:
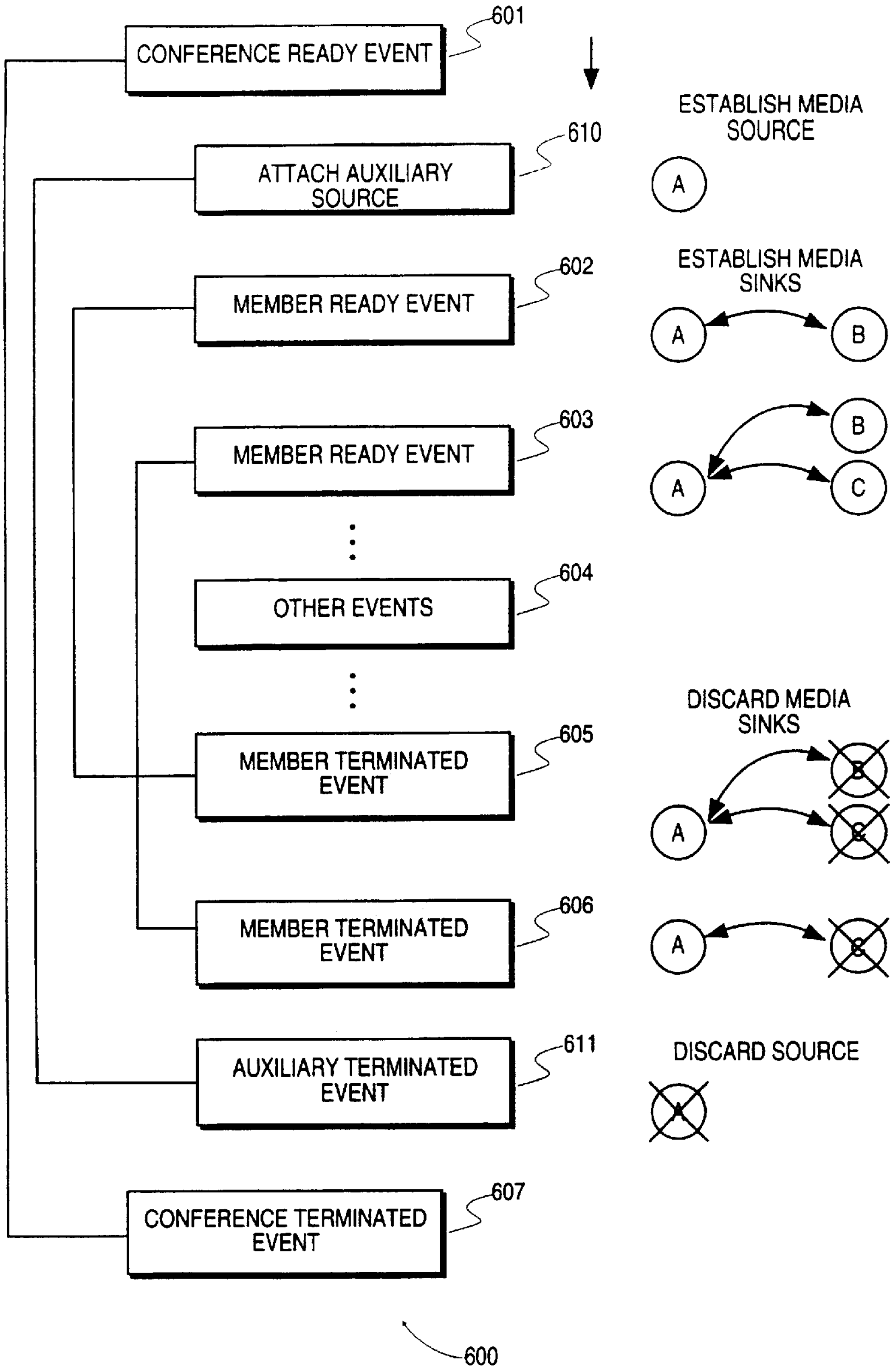
FIG. 6 shows a sequence of typical conference events in a conference component which are issued to an application.

A typical series of events which occur after the establishment of a teleconference by the conference component in an application is illustrated in FIG. 6 as 600. For example, upon an initial desire by an application to enter into a conference (as expressed by an API call) or a call from another participant, a conference-ready event 601 (e.g. mtConferenceReadyEvent) is generated. The application then creates a media source in the conference component (e.g., member A) which is to provide the conference information. Subsequent to that, any auxiliary media sources may also be attached to the main conference at step 610 for a second media source (e.g. by the call MTConferenceAttachAuxiliary Source). Then, any members that are new to the conference are recognized as being ready by the receipt of MemberReady (e.g. mtMemberReady) events (e.g., 602 and 603 of FIG. 6). This establishes the media sinks such as b and c illustrated in FIG. 6. Then, during the teleconference session, a variety of other events 604 may be issued and acted upon by the conference component. These may include message events, mode events, incoming call events, data transmission events, etc. Members leaving the conference result in the issuance of MemberTerminated (e.g. mtMemberTerminatedEvent) events to the application program such as 605 or 606. Thus, for every MemberReady event for any member participating in a conference, there is a corresponding MemberTerminated (e.g. mtMemberTerminatedEvent) event prior to the end of the conference. In addition, the auxiliary source and the conference itself is terminated via the Auxiliary Terminated (e.g. mtAuxiliaryTerminatedEvent) event 611 and the conference terminated event 607 as illustrated in 600 of FIG. 6. This notifies the application that the conference is terminated, and teleconference data should no longer be transmitted. Any additional clean up operations are then performed by the application, and the source may be discarded.

Figure 7:
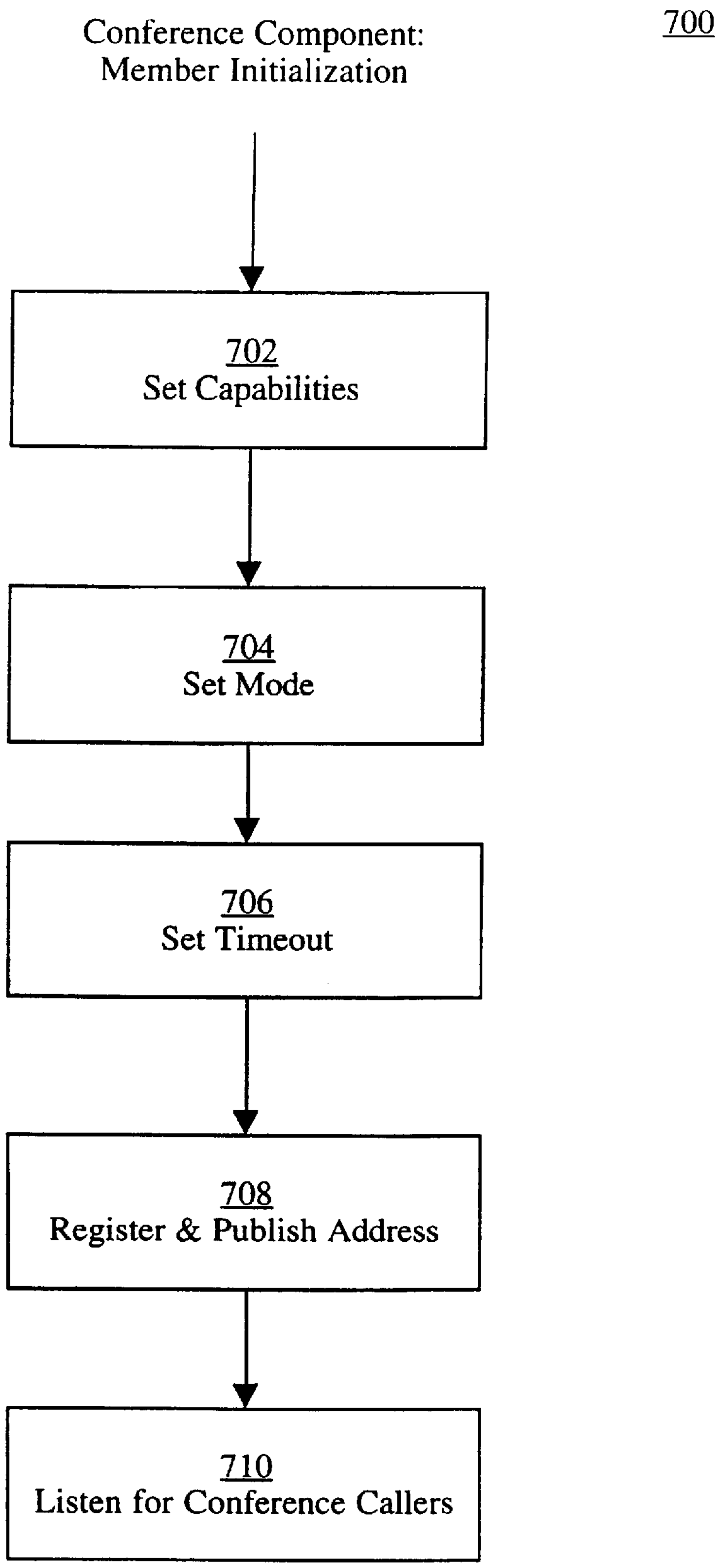
FIG. 7 shows a typical sequence of steps performed for member initialization within the conference component.

A typical application's initialization is shown as process 700 of FIG. 7. The application program makes a number of API calls in order to set various parameters associated with the member or potential participant. First, an application may cause the conference component to set its capability at step 702 if it is different than the default. The call to "MTConferenceSetMessageCapabilities" causes the conference component to recall in a store the specific application capabilities within the conference component for the specific conference which are later used during transmission of messages to alert recipients that the sender application has certain functional capabilities prior to the establishment of a connection between the sender and the receiver. Each capability has associated with it a type, version, and "desire" of the capability. Each desire for each capability type may be flagged as:

1. optional;
2. desired;
3. required; or
4. a negotiation message.

These types of capabilities are included in a capabilities list which is transmitted to endpoints, as will be described below. An "optional" capability is a message which is not required to be exchanged before setting up a conference. A "desired" capability is one which is not required that it be exchanged before setting up a conference, however, it is preferred that it is. A "required" capability is one which requires that a message be exchanged before setting up a conference. This may include access control or other messages which are transferred prior to setting up a conference. An access control capability may include the transmission of a account number and password prior to the commencement of a teleconference. A "negotiation message" is a capability which indicates that the application wishes to query the receiving application. In the case of a negotiation message capability, the type field associated with the capability allows the requests of information about the applications prior to the establishment of a conference (e.g. about the type of software and hardware components the application is interested in, such as sound). Any other types of exchanges which require negotiated information between applications may be set.

Once all individual capabilities have been set by the issuance of "Set Capabilities" API calls (e.g. MTConferenceSetCapabilities) to the conference component at step 702, a member may set its operating mode at step 704. The mode will be contained within a mode mask value which is sent in the API call to the conference component, and moreover, is included in certain messages transmitted from the conference component in the sender to the conference component in the receiver. The mode mask specifies the characteristics of a conference that the member makes available. Different capabilities, modes, and other initialization operations shown in FIG. 7 may be set for any number of conference types which are made available by the member. At any rate, the default mode includes the following values:

1. send media;
2. receive media;
3. shareable; and
4. joiner.

The "send media" mode flag indicates that the member intends to send media data in its conferences. Most members will want to send media, however, there will be instances where the member will be a receive-only member, thus the send media mode flag will not be set. The receive media mode flag indicates that the member intends to receive media in conferences. In the case of a send-only member (e.g., a server providing a real-time video and/or audio source), will have the receive media mode flag set to "off" (e.g., a numeric value '0'). The "shareable" mode flag indicates that the member is willing to share the conference media data with new conference members. Thus, in the instance of a send-only media server, the shareable mode flag would be set indicating that new members can receive the conference data.

The "joiner" mode flag indicates that all conference members are allowed to interact. This would allow two-way transmission between each of the conference members. However, the setting of this flag to "off" (e.g., a numeric value '0') results in broadcast type conferences wherein one member sends media data to other conference members, but the individual conference members do not exchange any media data among themselves. Each of these mode flags is transmitted at the beginning of a connection (e.g., contained within the "hello" message 1400 in FIG. 14).

By default, the conference component establishes conferences that are fully two-way media data capable, shareable, and joinable. If different characteristics are desired, then the application must call "set mode" (e.g. MTConferenceSetMode) at step 704, along with the appropriate flag(s) set. Conference mode settings are stored and associated with a particular conference ID in the sender's conference component so that when messages are created for that conference ID, the appropriate mode flags are transmitted along with the initialization or other messages sent before any other communications.

In addition to the capabilities and mode settings at steps 702 and 704, a time-out value associated with calls placed from the member may be set (e.g. using the API call MTConferenceSetTimeOut). The time-out value is then included at the beginning of certain messages preceding a conference in order to enable a recipient to determine when the caller will stop listening for responses. This allows certain features to be incorporated into participant conference components such as the smart triggering of events based upon context. For example, if the recipient is receiving a call, but a user does not wish to take the call at that time, the recipient's conference knows the time-out occurs and can take certain context-dependent action (e.g., forward the call, send a message, etc.).

The application can then invoke an API call "Listen for Call" (e.g. MTConferenceListen) which implements steps 708 and 710. At step 708, using the underlying transport to which the system is connected, a high level address is registered and published. This then allows other potential participants in the system to call the member. The registration and publication of the address is implementation-dependent, depending upon the media to which the system is connected. Then, at step 710, the conference component waits for incoming calls.

The conference component in the member enters an idle state wherein incoming messages, alerts for the transport component, API and calls will be detected and acted upon. Note that the capabilities, mode, and time-out values are all optional, and the default settings may be used by the member if none of these functions is required by the application. In the call to the MTConferenceListen function, the application must specify the networks on which the member is willing to accept calls. The conference component proceeds to register the member on those networks, doing whatever is appropriate in the various network contexts, and sends an mtListenerStatusEvent to the application to specify whether the registration attempt was successful. After listeners are operational, if another application desires to establish communication with the application, then an mtIncomingCallEvent is forwarded to the application.

Figure 8:
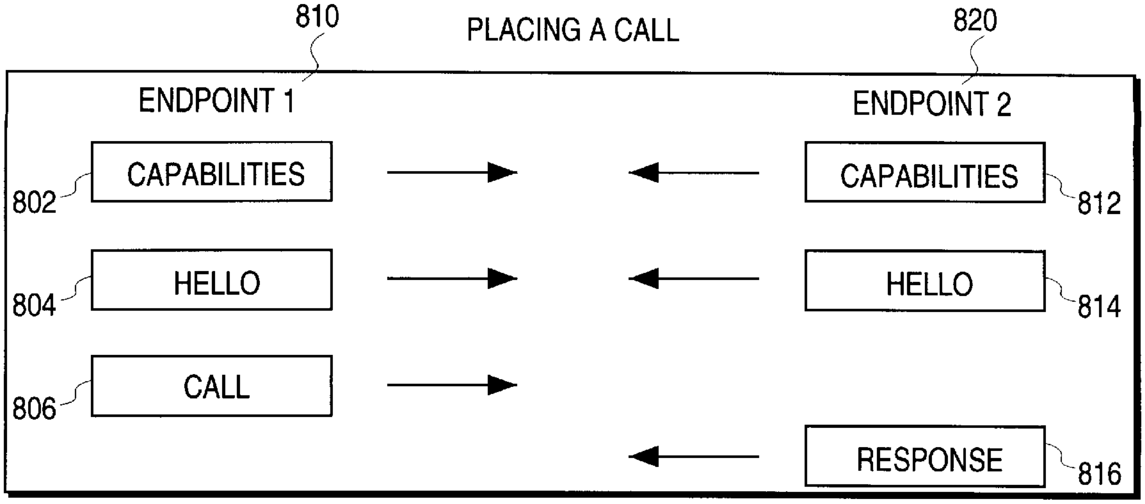
FIGS. 8–10 show typical exchanges of messages for different operations.
Figure 9:
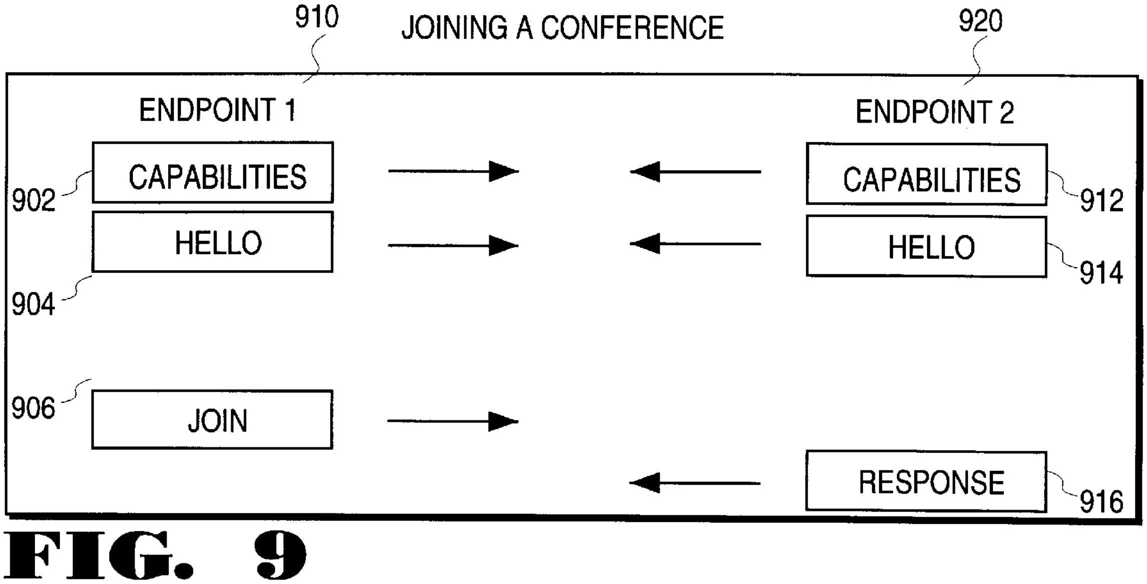
Figure 10:
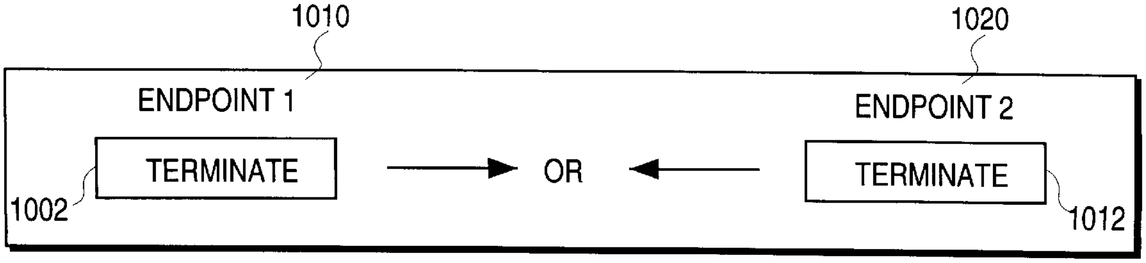

FIGS. 8–10 show examples of the various message exchanges between two endpoints. Messages are generated by conference component 400 depending upon operating context, and application calls. FIG. 8 shows an example of a calling sequence for setting up a conference between two endpoints. Upon the commencement of a call from a first endpoint such as 810 shown in FIG. 8, and a second endpoint such as 820 shown in FIG. 8, a "capabilities" message 802 is transmitted from the endpoint 810 to the endpoint 820 if they have been set by the caller. The exchange of "capabilities" messages 802 and 812 between endpoint 1 810 and endpoint 2 820 are exchanged after a control channel has been opened on the transmission medium between the participants in an implementation-dependent manner (e.g. by invoking MTConferenceCall). This identifies the capabilities of each of the endpoints, if the capabilities of the application are desired to be transmitted. Once capabilities have been transmitted from each endpoint, each endpoint further transmits Hello messages 804 and 814 to identify themselves. The details of the capabilities, Hello, and other messages illustrated in the figure will be discussed below. The Hello message is the first step in establishing a conference, and allows conference components in different systems to exchange basic identification and mode information. Subsequent to the exchange of Capabilities messages (if any), and the Hello messages 804 and 814, the endpoint 1 810 wishing to establish the conference sends a call message 806 to endpoint 2 820. Subsequent thereto, if endpoint 820 desires to engage in the teleconference with endpoint 1 810, it sends a response message 816 to endpoint 1 810. Then, upon the transmission of the call message 806 and the receipt of the response message 816, a teleconference is then established between endpoint 1 810 and endpoint 2 820. The details of the process steps performed within each endpoint are discussed with reference to FIGS. 11 and 12.

FIG. 9 illustrates a "Join" protocol process. This is similar to the calling process, however, a "Join" message 906 is sent to the second endpoint instead of the "call" message 806. The details of a Join are discussed with reference to FIGS. 26*a*–26*c* below.

FIG. 10 illustrates the messages exchanged for a terminate message. As illustrated, an endpoint may issue a terminate message to terminate a teleconference. No response is required for any receivers.

Figure 11:
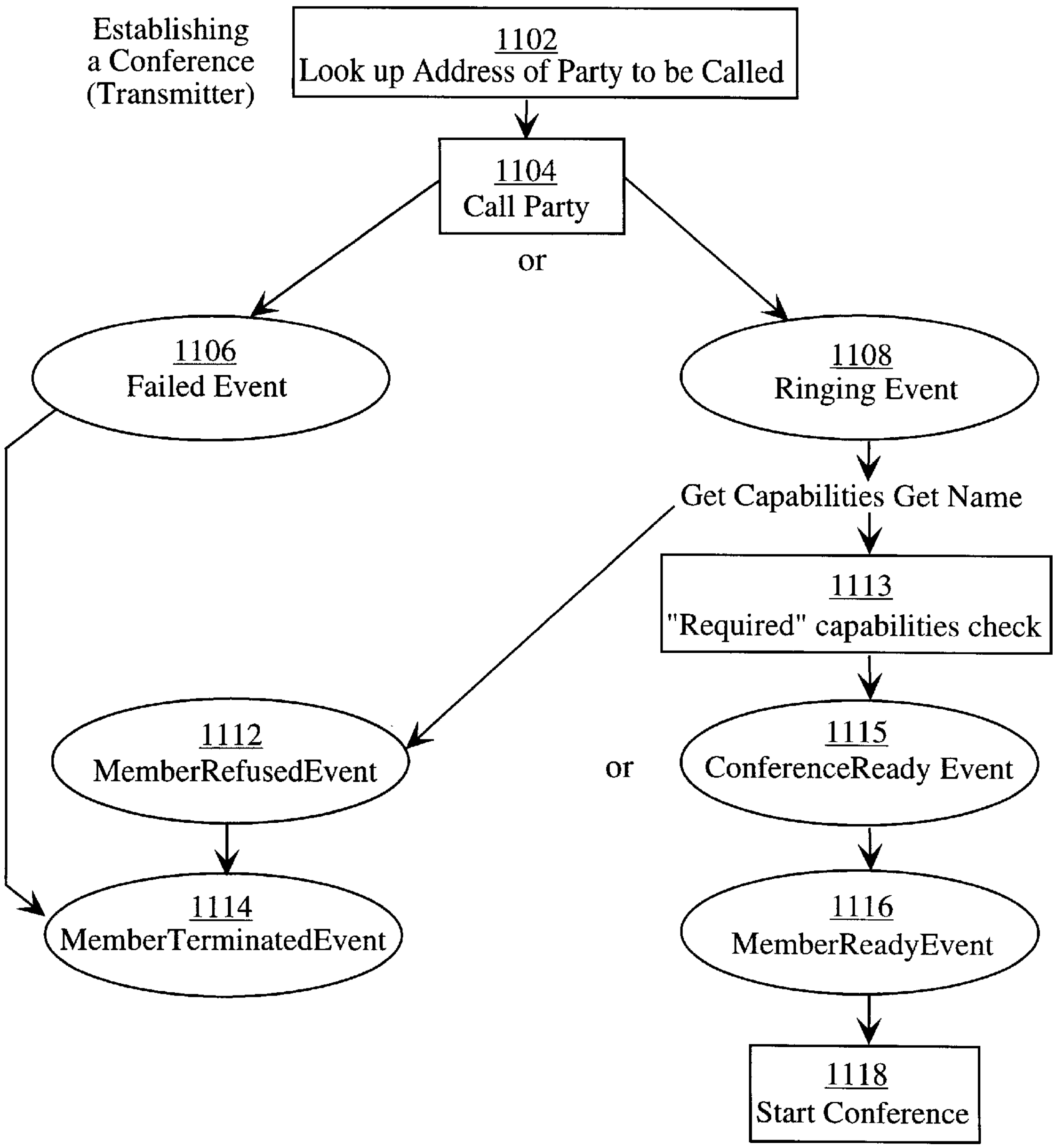
FIG. 11 shows a detail of a first endpoint establishing a teleconference.

FIG. 11 shows the process steps performed by a first participant (e.g., endpoint 1 810) wishing to establish communication with a second participant system (e.g., endpoint 2 820). First, at step 1102, the caller via implementation-dependent means, accesses the address of the party it wishes to call, either by reference to an internal store, referencing a server or other implementation-dependent manner. Once this has been performed, the application invokes the API call MTConferenceCall in order to call the party at step 1104. Responsive thereto, either a failed event 1106 (mtFailedEvent) is received by the caller, or a ringing event 1108 (mtPhoneRingingEvent) when the call message has been transmitted to the second participant. In the event of a ringing event, the endpoint can then get the capabilities, mode and the name of the endpoint such as by examining the data contained in the Capabilities message 812 and/or the Hello message 814. Any "required" communication between the caller and receiver may also be performed. Then, the first sender can appropriately configure itself for the second endpoint. Once any necessary message exchanges and/or configurations have been performed in the caller, then the caller will either receive a MemberRefused event 1112 (e.g. mtRefusedEvent), for example, if the calling member does not provide the necessary access control subsequent to the call message, or, a MemberReady event 1116. Also, a failed event 1106 can be detected at any time, followed by a MemberTerminated event 1114. In the case of a MemberRefused event 1112, then the conference component will generate a MemberTerminated event 1114, and a conference terminated event will then be issued indicating the end of the conference. Once capabilities have been obtained, any required capabilities are checked for at step 1113 (e.g. such as any actions that must be performed before the receiver accepts the call). Subsequent thereto, a ConferenceReadyEvent1115 (e.g. MTConfReadyEvent) and a MemberReady event 1116 (e.g. mtMemberReadyEvent) can be received by the application, then the endpoint can then engage in the exchange of messages typical during a conference, thus commencing the conference at step 1118.

Figure 12:
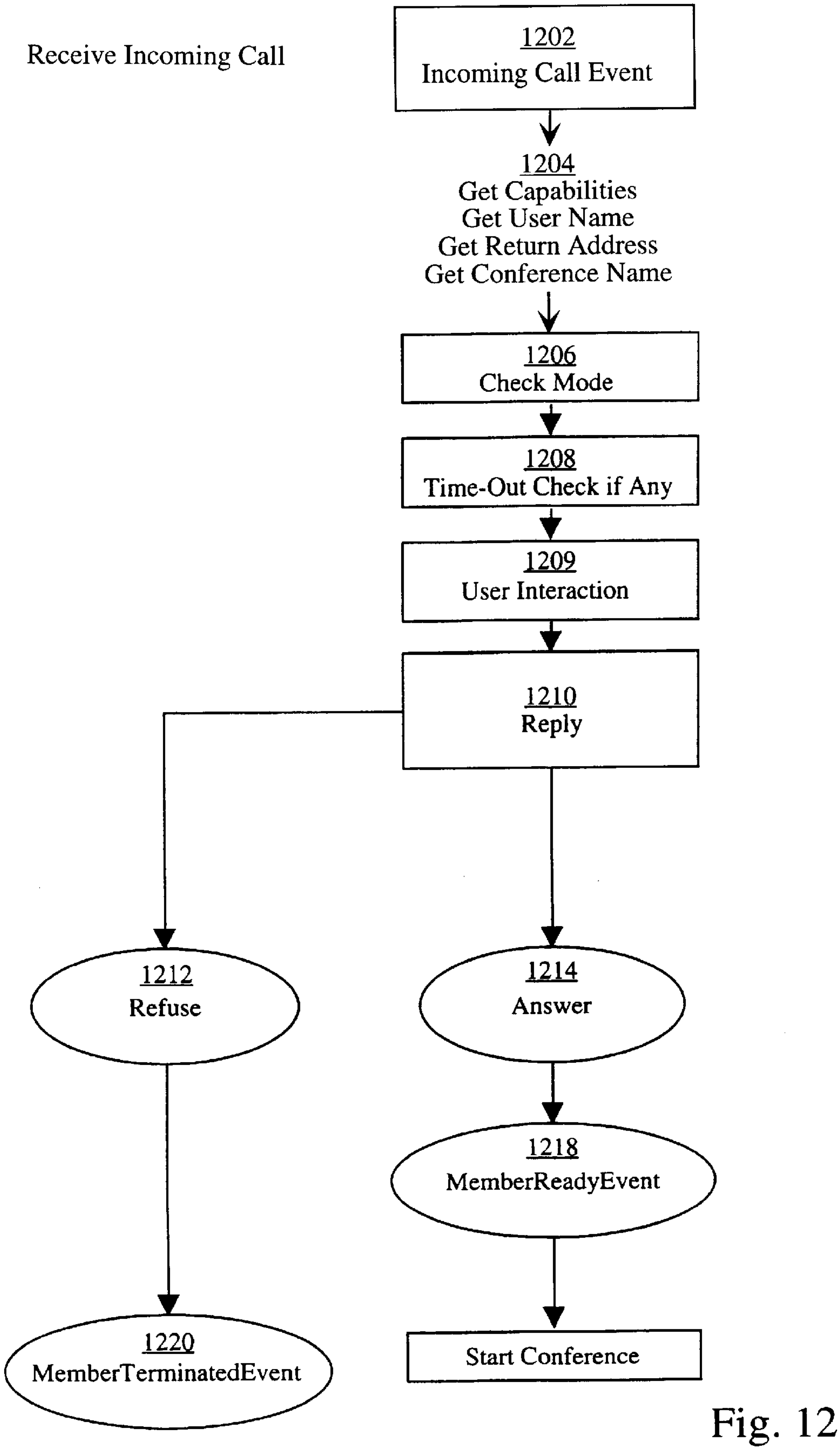
FIG. 12 shows a sequence of steps performed in a second endpoint receiving the messages sent from a first endpoint during the establishment of a teleconference.

As shown in FIG. 12, the sequence of steps performed by the receiver is illustrated. For example, at step 1202, the receiver application will detect an incoming call event 1202. Subsequent thereto, the receiver can then determine mode, capabilities, caller's name, conference name, and/or return address of the party wishing to engage in the conference. The mode can also be checked for at step 1206. Once this has been done, then a time-out check, if any, at 1208 can be performed in the receiver. The time-out check may be performed, depending upon an application's implementation, by checking the time-out field shown at field 1504 in FIG. 15, which indicates how long the transmitter will wait prior to timing out and generating a CallFailed event (e.g. mtFailedEvent) in order to terminate the call. In this case, according to implementation, the receiver may do a variety of things, for example, issuing a busy signal to the transmitter, issuing a message to the caller or, taking some action, such as forwarding the call to another party. Thus, the embedding of the time-out field 1504, within the initial connection message "Hello," provides for certain intelligent features in the potential participants of a teleconference. Once any mode checks, if any, have been performed at step 1206, then at step 1208 a time out check, if any, may be performed. Any user interaction may take place at step 1209. The receiver will then issue a reply at step 1210. The reply may indicate either refusal to answer the call (e.g., due to access control, or the participant already engaging in another conference), or choose to respond to the call in the affirmative indicating that the teleconference may commence. In the case of a refusal, the MemberTerminated 1220 event (mtMemberTerminatedEvent) is issued to the application. In the case of the member answering, the MemberReady event 1218 (mtMemberReadyEvent) is issued indicating that the medium channel is open and the conference can commence.

Conferencing Messages

Conference components exchange a number of messages in order to establish, maintain, and terminate conferences. Conference components also send messages that encapsulate user data, that is, the data that is exchanged by the programs that are using the conference.

After establishing a transport connection but prior to establishing a conference channel with a remote system, a conference member may send either a Capabilities message 1300 or an Auxiliary message 1700. The member then sends a Hello message 1400 to identify itself, specifically its mode of operation (send media, receive media, shareable, or joiner) followed by a Call message 1500 (to set up a conference) or a Join message 1800 (to join to an ongoing conference). The remote member sends a Response message 1600 in answer to the Call or a Join message 1800. Once a conference is established, a member can combine calls or conferences by sending a Merge message 1900. Conference members may send or receive a Terminate message 2300 to end a conference. Connections initially are point-to-point between members of a conference. If the transport medium supports multicast addresses and more than one member is participating in a conference, a broadcast to a multicast address can be used as an optimization. The conference component uses the BroadcastRequest and BroadcastAck messages 2400 and 2500 to negotiate the transition from point-to-point to multipoint connections using multicast addresses.

All messages supported in the conference messaging protocol are preceded by a 2-byte character identifying the message type. For example for a capabilities message shown in FIG. 13, field 1302 contains a 'K'. All messages are further terminated by a NULL such as that shown in field 1308 of FIG. 13. The Capabilities message 1300 allows a potential member to tell other potential conference members what it can and cannot do in a conference. Each member sends this message before sending the "Hello" message (1400 of FIG. 14) if capabilities other than the default are supported.

| Field | Size | Value |
|---|---|---|
| type 1302 | 2 bytes | 'K' |
| delimiter 1304 | 1 byte | newline |
| capabilitiesList 1306 | 0-n bytes | (alphanumeric) |
| terminator 1308 | 1 byte | NULL |

capabilitiesList 1306

The member's capabilities. This field is optional. If specified, it contains a list of the member's capablilities. An application specifies its capabilities by calling the conference component's MTConferenceSetMessageCapabilities function.

The Capabilities message 1300 shown in FIG. 13 informs other potential conference participants about a member's capabilities. These capabilities relate directly to messages the member either supports or requires, one capability for each conferencing message type that the component supports. The messages themselves are defined by the type of application the member is running. For example, videophone applications and chat lines deliver different services, and use different messages to do so. As a result, the capabilities a member supports will change in light of the application that is participating in the conference. Entries in the capabilitiesList field may request information from the remote system. By setting an entry's "desires" field (2010 of FIG. 20) mtNegotiationMessageCapabilities ('N'), a conference member can query for specific information (e.g. about a given component type, such as a codec, hardware/software features supported, etc.). The type field can contain the component type value.

In response to a negotiation Capabilities message, the remote member formats a user data message, for example, containing available component subtypes. Note that this list may contain duplicate entries and entries with a value of NULL. To parse this array, a member must determine the array's size. After sending a Capabilities message 1300, the member sends a Hello message 1400 to establish a conference.

A Hello message (e.g., 1400 of FIG. 14) is sent at the start of a conference by each endpoint. The Hello message identifies basic capabilities of the sender and the mode in which it will operate. It contains the following:

| Field | Size | Value |
|---|---|---|
| type 1402 | 2 bytes | 'H' |
| MinimumVersion 1404 | 1-n bytes | (numeric) |
| delimiter 1406 | 1 byte | colon |
| maximumVersion 1408 | 1-n bytes | (numeric) |
| delimiter 1410 | 1 byte | newline |
| conferenceMode 1412 | 1-n bytes | (numeric) |
| delimiter 1414 | 1 byte | newline |
| name 1416 | 1-n bytes | (alphanumeric) |
| delimiter 1418 | 1 byte | newline |
| terminator 1420 | 1 byte | NULL |

minimumVersion 1404

The oldest version of the conference protocol supported by the sending component maximumVersion 1408

The newest version of the conference protocol supported by the sending component.

conferenceMode 1412

The desired conference operating mode. This field contains a value that corresponds to the operating mode the sender desires for this conference. Applications specify their desired mode by a SetMode API call (e.g. MTConferenceSetMode discussed above).

name 1416

The name of the prospective conference member. This name identifies the entity that wants to join the conference, and may represent either an auxiliary data source or a new user. Applications specify a user name by calling the MTConferenceListen API call. The auxiliary name is specified in a MTAttachAuxiliary API call.

The Hello message 1400 is the first step in establishing a conference. This message allows conference components on different systems to exchange basic identification and capability information. Before sending a Hello message 1400, a conference component may send either a Capabilities 1300 or an Auxiliary message 1700. The type of message sent depends upon the role the member anticipates playing in the conference. If the member is looking to join or start a conference, the conference component sends a Capabilities message. If the member is setting up an auxiliary media data source, the component sends an Auxiliary message 1700. Following this message, the conference component can enter the call setup phase by sending the Call message 1500. If the member wants to provide an auxiliary data source to an existing conference, or join an existing conference, the component sends the Join message 1800.

Call message 1500 of FIG. 15 begins the process of establishing a conference connection between two possible participants. This is akin to dialing a number from a phone directory.

| Field | Size | Value |
|---|---|---|
| type 1502 | 2 bytes | 'C' |
| callTime-out 1504 | 1-n bytes | (numeric) |
| delimiter 1506 | 1 byte | tab |
| ConferenceName 1508 | 1-n bytes | (alphanumeric) |
| delimiter 1510 | 1 byte | newline |
| callingConfID 1512 | 1-n bytes | (alphanumeric) |
| delimiter 1514 | 1 byte | newline |
| terminator 1516 | 1 byte | NULL |

callTime-out 1504

The amount of time the calling component is willing to wait for an answer. This field specifies the number of ticks (1/60 of a second) the calling component will wait before deciding that the call has not been answered. Called components must respond within this time period. This value may be used by a potential responder for taking some automatic action if the user doesn't answer before the timeout.

ConferenceName 1508

The conference name. If the caller is establishing a conference, this is the name the caller has assigned to the conference. If the caller is connecting to a conference server, the is the name of the server's conference. Applications set the conference name by calling the MTConferenceCall function.

callingConfID 1512

The caller's unique conference identifier. This field uniquely identifies the caller's conference endpoint on the network. Conference components create conference identifiers on behalf of calling applications which are unique within the conference component. Call ID's are discussed with reference to 2200 of FIG. 22.

The Call message 1500 shown in FIG. 15 begins the process of establishing a conference between two participants. This message can be used in two ways. First, this message can create a conference between two participants. In this scenario, the caller assigns a name to the conference, so that other possible participants may join later. Alternatively, this message can request to join a conference that is managed by a conference server on a network. For example, the server will allow incoming calls, but the function of the server is to merge the new conference due to the call with other ongoing conferences. In other words, the server acts exclusively as a "joiner" and does not supply media data. Once the call is set up, the caller can begin exchanging user data with other conference participants.

The response message 1600 of FIG. 16 is sent in response to Call or Join messages 1500 or 1800.

| Field | Size | Value |
|---|---|---|
| type 1602 | 2 bytes | 'R' |
| callResponse 1604 | 1-n bytes | (signednumeric) |
| delimiter 1606 | 1 byte | newline |
| destinationConfID 1608 | 1-n bytes | (alphanumeric) |
| delimiter 1610 | 1 byte | newline |
| terminator 1612 | 1 byte | NULL |

callResponse 1604

The result. This field indicates the result of the preceding Call request. This field is set to '0' if the request was successful. Otherwise, it contains an appropriate result code.

destinationConfID 1608

The other endpoint's unique identifier. This field identifies the other participant in the conference.

The Response message 1600 allows the caller to determine the success of a Call or Join request. The Response message 1600 indicates how the user at the remote system reacted to the call (for example, whether the user answered the call). The callResponse field 1604 contains the request's result code. If non-zero, an error occurred and the request was not successful. Otherwise, the destinationConfID field 1608 identifies the endpoint with which the caller may now communicate.

The auxiliary message 1700 allows one member to alert the other members of a conference that it is about to provide an auxiliary media data source (a source associated with an ongoing conference). This message may be used in place of the Capabilities message 1300 if a participant is being alerted about the presence of an auxiliary media source. The member sends this message before sending the Hello and Join Messages 1400 and 1800, and then proceeds to adding an auxiliary data source to the conference.

| Field | Size | Value |
|---|---|---|
| type 1702 | 2 bytes | 'A' |
| parentConfID 1704 | 1-n bytes | (alphanumeric) |
| delimiter 1706 | 1 byte | newline |
| terminator 1708 | 1 byte | NULL |

parentConfID 1704

The member's conference identifier. This field identifies the member's existing conference endpoint (the conference identifier the member supplied in the Call message when it first joined the conference). This allows other conference participants to identify the source of the auxiliary data within each participant.

The Auxiliary message 1700 informs other conference participants that a member is about to provide an auxiliary conference data source. For auxiliary data sources, this message replace the Capabilities message during early interactions. The member must send this message to each conference participant. The member then sends a Hello 1400 and a Join message 1800 to each participant. Other participants then accept the new data source by accommodating the Join request.

A Join message 1800 of FIG. 18 allows a member to join an existing conference, given that conference's identifier. This message is useful for adding auxiliary data sources to an existing conference, and for merging two existing conferences.

| Field | Size | Value |
|---|---|---|
| type 1802 | 2 bytes | 'J' |
| destinationConfID 1804 | 1-n bytes | (alphanumeric) |
| delimiter 1806 | 1 byte | newline |
| callingConfID 1808 | 1-n bytes | (alphanumeric) |
| delimiter 1810 | 1 byte | newline |
| memberList 1812 | 0-n bytes | (alphanumeric) |
| terminator 1814 | 1 byte | NULL |

destinationConf ID 1804

The remote endpoint's unique conference identifier. This field identifies the conference to join on.

callingConfID 1808

Unique conference identifier. This field uniquely identifies the caller's conference endpoint on the network. Conference components create conference identifiers on behalf of calling applications. If the message is adding an auxiliary media data source, this is the auxiliary's identifier.

memberList 1812

A list of other conference participants. This list identifies all other known conference participants that are willing to exchange data with new participants (that is, they have the Joiner Mode Mask [e.g. mtJoinerModeMask] set in their conference mode). The conference component can connect with each participant with whom it is not already connected. If the message is adding an auxiliary (via the issuance of an auxiliary message 1700), this list contains the endpoint identifier of each participant to which the caller is making the auxiliary available. It is up to each of them to respond.

This is a list of conference endpoint identifiers; each element in the list is followed by a newline character.

The Join message 1800 allows a member to add an auxiliary data source to an existing conference or to merge two existing conferences. The caller sends this message to members of the conference in response to a merge or join request instead of a call message.

The Merge message 1900 of FIG. 19 combines two conferences. Recipients of this message connect with the listed members with whom they are not already connected.

| Field | Size | Value |
|---|---|---|
| type 1902 | 2 bytes | 'M' |
| conferenceName 1904 | 1-n bytes | (alphanumeric) |
| delimiter 1906 | 1 byte | newline |
| myConfID 1908 | 1-n bytes | (alphanumeric) |
| delimiter 1910 | 1 byte | newline |
| memberList 1912 | 0-n bytes | (alphanumeric) |
| terminator 1914 | 1 byte | NULL |

conferenceName 1904

The new conference name resulting from the merge. This is the name that was assigned to the conference when the conference was established. Applications specify the conference name by calling the MTConferenceCall API function.

myConfID 1908

Unique conference identifier. This field uniquely identifies the caller's conference endpoint in the target conference. Conference components create conference identifiers on behalf of calling applications.

memberList 1912

A list of other conference participants. This list identifies other current conference participants. This list contains the endpoint identifier of each new participant. This is a list of conference endpoint identifiers; each element in the list is followed by a newline character.

The Merge message causes the combination of two conferences. This is the mechanism for creating conferences with more than two participants. The caller sends this message to each existing conference member, specifying the conference's name. Each endpoint establishes communications with any new endpoints. By convention, the endpoint with the higher conference identifier value establishes the connection (to avoid duplicate or missed connections). Members of the conference receive a Join message 1900 instead of a Call message 1500 when contacted by each new member.

Field Specifics

Figures 20, 21, 22, 23, 24, 25:
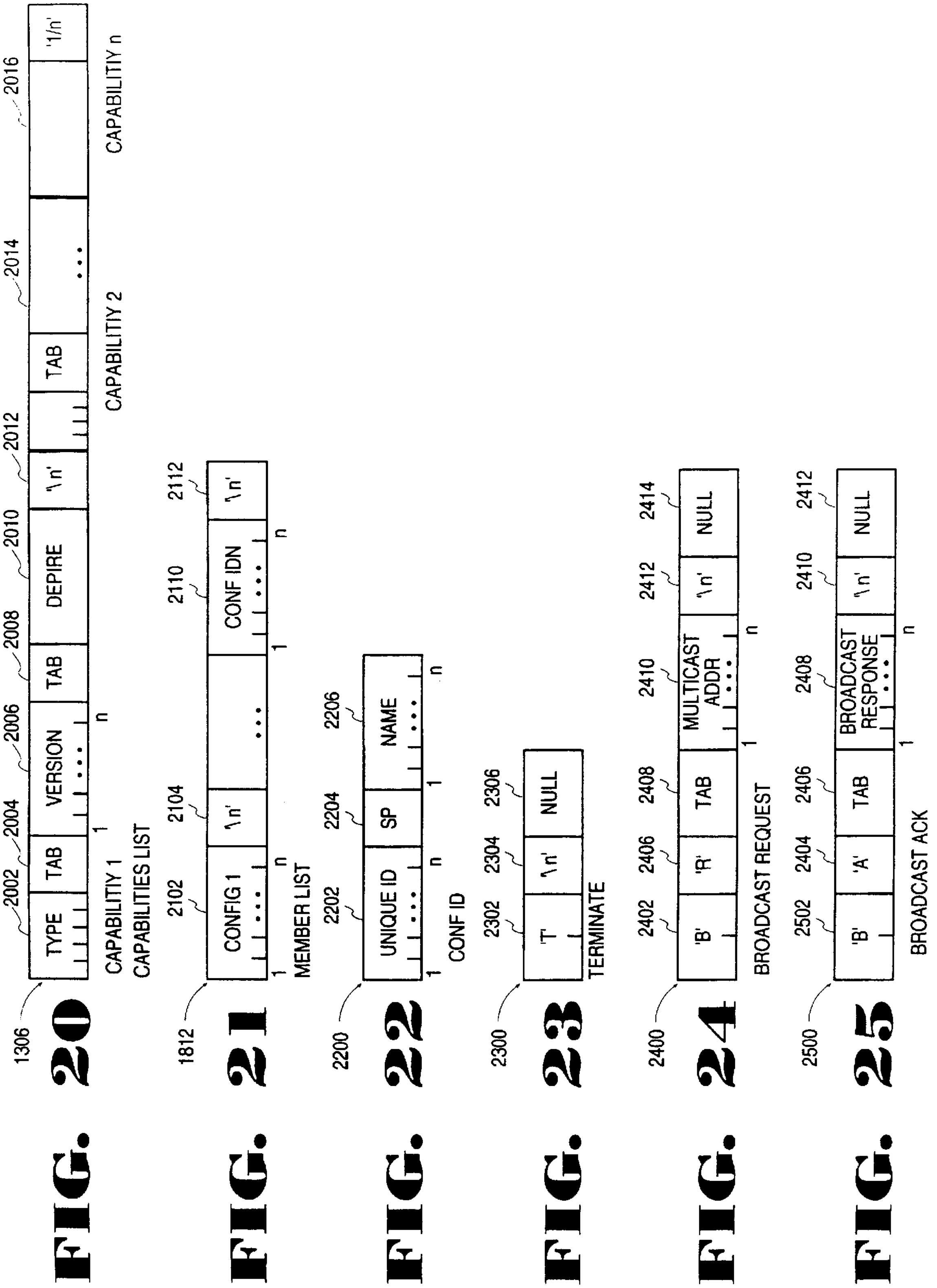

A capabilities list such as shown in FIG. 20 (e.g., field 1306) contains information about the message supported by a conferencing application. The list consists of zero or more lines of information; each line specifies a single capability and consists of the following fields.:

| Field | Size | Value |
|---|---|---|
| type 2002 | 4 bytes | (alphanumeric) |
| delimiter 2004 | 1 byte | tab |
| version 2006 | 1-n bytes | (numeric) |
| delimiter 2008 | 1 byte | tab |
| desires 2010 | 1 byte | (alphanumeric) |
| delimiter 2012 | 1 byte | newline |

type 2002

Identifies a message by reference to a unique type value.

version 2006

Message version number. Specifies the most-recent version of the message that the application supports.

desires 2010

Support level. This field indicates the level of support required by the application. Possible values are:

mtMessageOptionalCapability

Optional. Indicates that the message is optional. The value corresponding to this option is 'O'.

mtMessageDesiredCapability

Desired. While still optional, this value indicates that the application prefers to receive this message early in the call (e.g. prior to establishing a call, one member may request that the recipient send his business card for long-term storage). The value corresponding to this option is 'D'.

mtMessageRequiredCapability

Required. The application must receive this message. The value corresponding to this option is 'R'.

mtNegotiationMessageCapability

Negotiate. The application wants to learn about the recipient's facilities. The value corresponding to this option is 'N'.

Conference identifiers such as 2200 shown in FIG. 22 uniquely identify a conference endpoint. Each endpoint represent a data source or sink for the conference. Note that a single system may have more than one conference endpoint (e.g., an auxiliary) in a given conference, and may have more than one conference at a time. A conference endpoint consists of the following fields:

| Field | Size | Value |
|---|---|---|
| UniqueID 2202 | 1-n bytes | (numeric) |
| separator 2204 | 1 byte | space |
| name 2206 | 1-n bytes | (alphanumeric) |

UniqueID 2202

Unique numeric identifier. This field contains a unique numeric endpoint identifier. Each conference component assigns its own identifiers in order to guarantee uniqueness within the context of a given name specified in the name field 2206.

name 2206

A unique name. Identifies the system on the network. The name is unique within the context of a given transport interface. It includes the type of the selected transport and network interface.

A member list such as 1812 of FIG. 21 is an array of zero or more conference identifiers 2102, 2110, etc. Each entry in the array is delimited by a newline character.

The Terminate message 2300 of FIG. 23 ends a conference, closing a member's communications with the participants to which it sends the message.

| Field | Size | Value |
|---|---|---|
| type 2302 | 2 bytes | 'T' |
| delimiter 2304 | 1 byte | newline |
| terminator 2306 | 1 byte | NULL |

The Terminate message 2300 is the last step in ending a member's participation in a conference. This message ends the member's conference communication with all participants to which it sends the message. If a member is leaving a conference altogether, it must send this message to each conference participant.

The BroadcastRequest message 2400 allows a member to find out if another conference member can accept broadcast (multicast) messages.

| Field | Size | Value |
|---|---|---|
| type 2402 | 2 bytes | 'B' |
| subtype 2406 | 1 byte | 'R' |
| delimiter 2408 | 1 byte | tab |
| multicastAddress 2410 | 1-n bytes | (alphanumeric) |
| delimiter 2412 | 1 byte | newline |
| terminator 2414 | 1 byte | NULL |

subtype 2406

The broadcast message subtype. This field must be set to 'R'.

multicastAddress 2410

The proposed multicast address. This field contains the multicast address on which the member proposes to send broadcast messages.

The BroadcastRequest message 2400 allows a member to determine whether another conference member can accept broadcast messages over a given multicast network address. The recipient indicates its ability to support the broadcast messages by sending a BroadcastAck message 2500 (described below). If the recipient cannot support broadcast messaging or cannot access this particular broadcast transmission, the calling member should continue to send point-to-point messages to the recipient.

The BroadcastRequest message 2400 is typically uses as part of the negotiation process that follows merging two conferences or the joining of any new members to a conference. As an optimization, conference participants may choose to set up broadcast capabilities as a more-efficient alternative to maintaining several different point-to-point connections.

The BroadcastAck message 2500 allows a member to respond to a BroadcastRequest message 2400.

| Field | Size | Value |
|---|---|---|
| type 2502 | 2 bytes | 'B' |
| subtype 2504 | 1 byte | 'A' |
| delimiter 2506 | 1 byte | tab |
| broadcastResponse 2508 | 1-n bytes | (signed numeric) |
| delimiter 2510 | 1 byte | newline |
| terminator 2512 | 1 byte | NULL |

subtype 2504

The broadcast message subtype. This field must be set to 'A'.

broadcastResponse 2508

The result. This field indicates whether the member can support the multicast address proposed in the BroadcastRequest message 2500.

The BroadcastAck message 2500 allows a member to indicate whether it can receive messages over a proposed multicast address. Another conference participant proposes a multicast address by sending a BroadcastRequest message 2408. If the recipient can support that address, it sets the broadcastResponse field 2508 to '0'. Otherwise, the broadcastResponse field 2580 contains an appropriate non-zero result code. This message is typically used as part of the negotiation process that follows merging two conferences. As an optimization, conference participants may choose to set up broadcast capabilities as a more-efficient alternative to maintaining several different point-to-point connections.

Figure 26A:
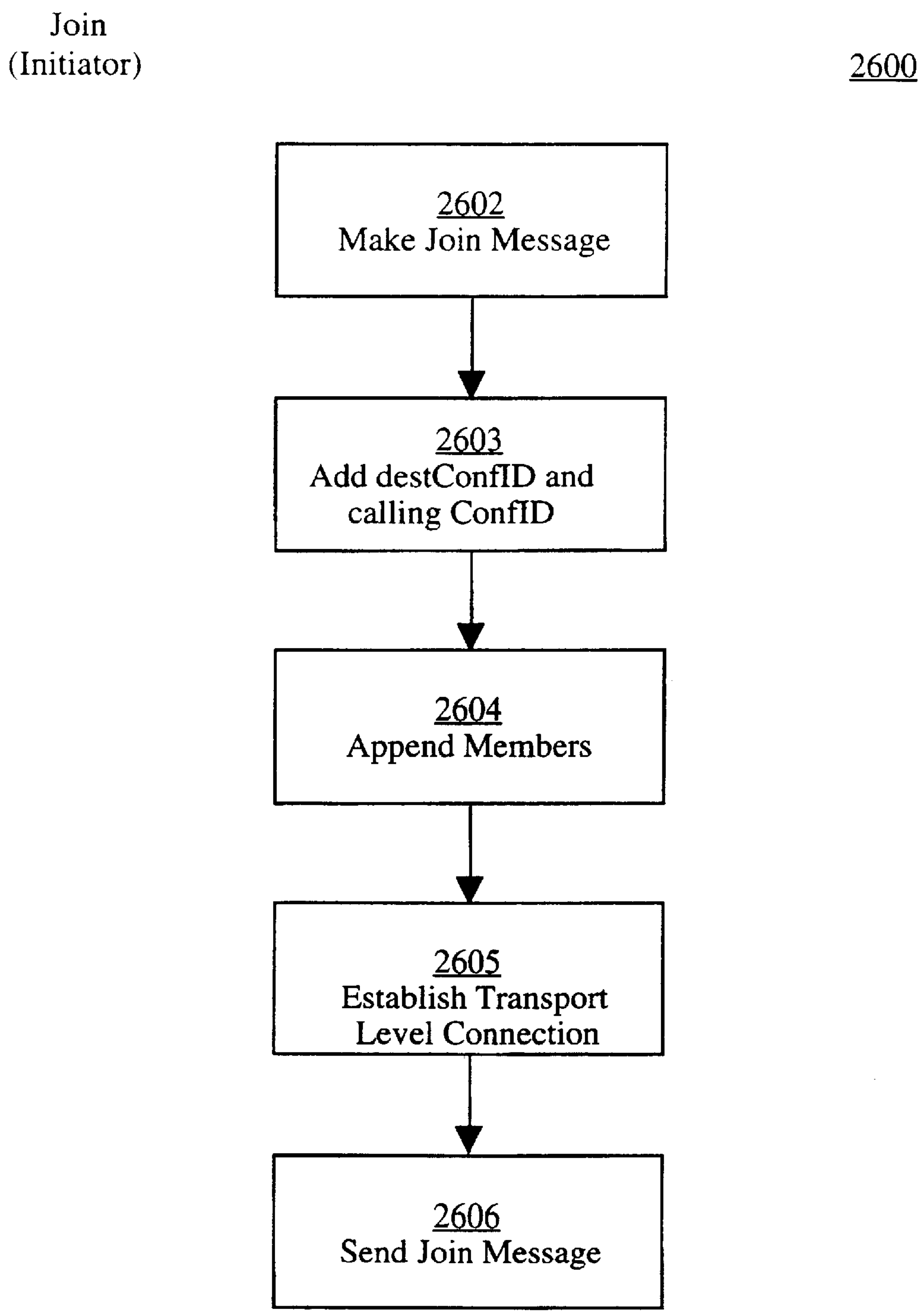
FIGS. 26*a*, 26*b*, 26*c*, and 26*d* show the steps taken for performing merge operations.
Figure 26B:
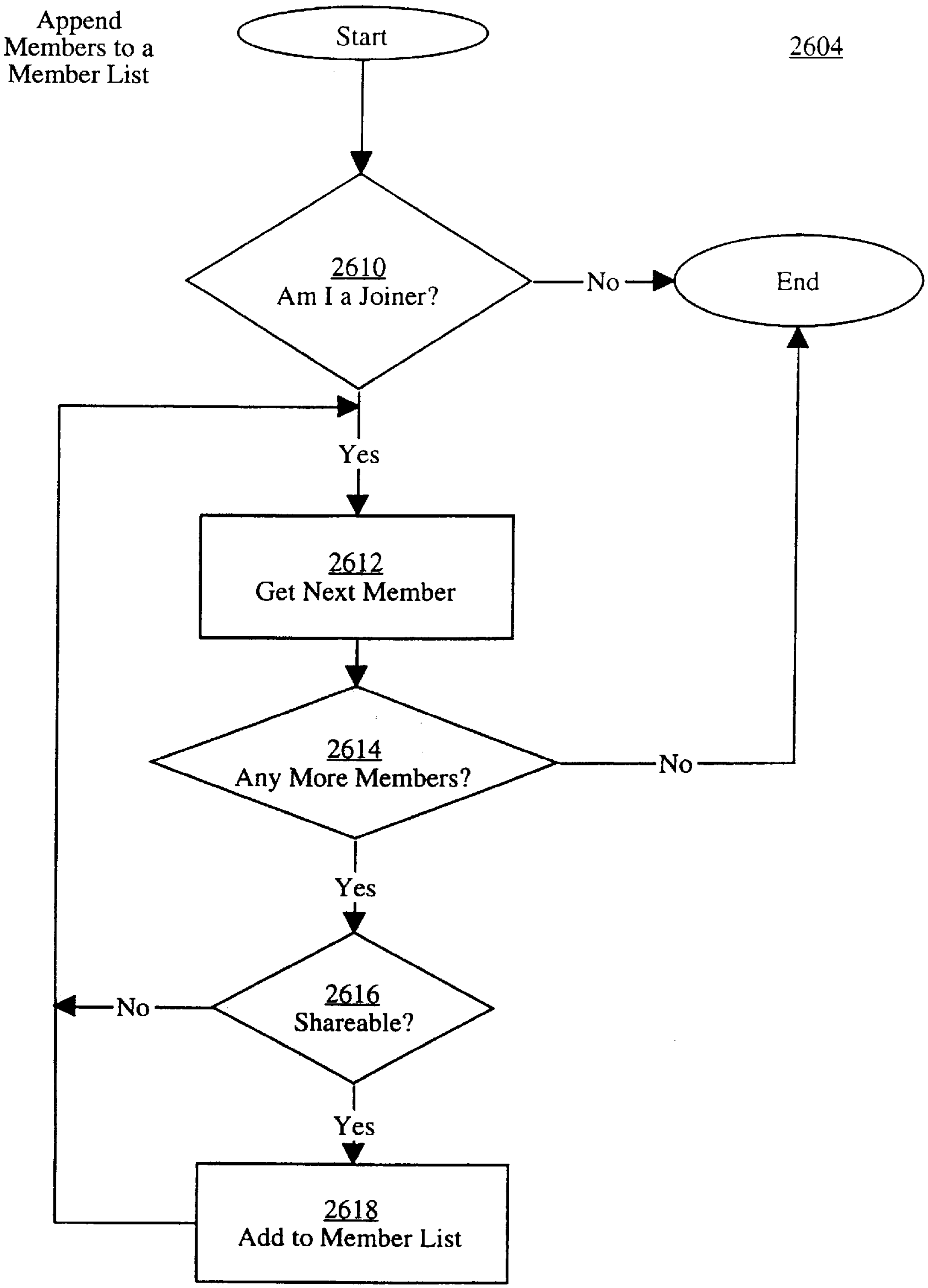
Figure 26C:
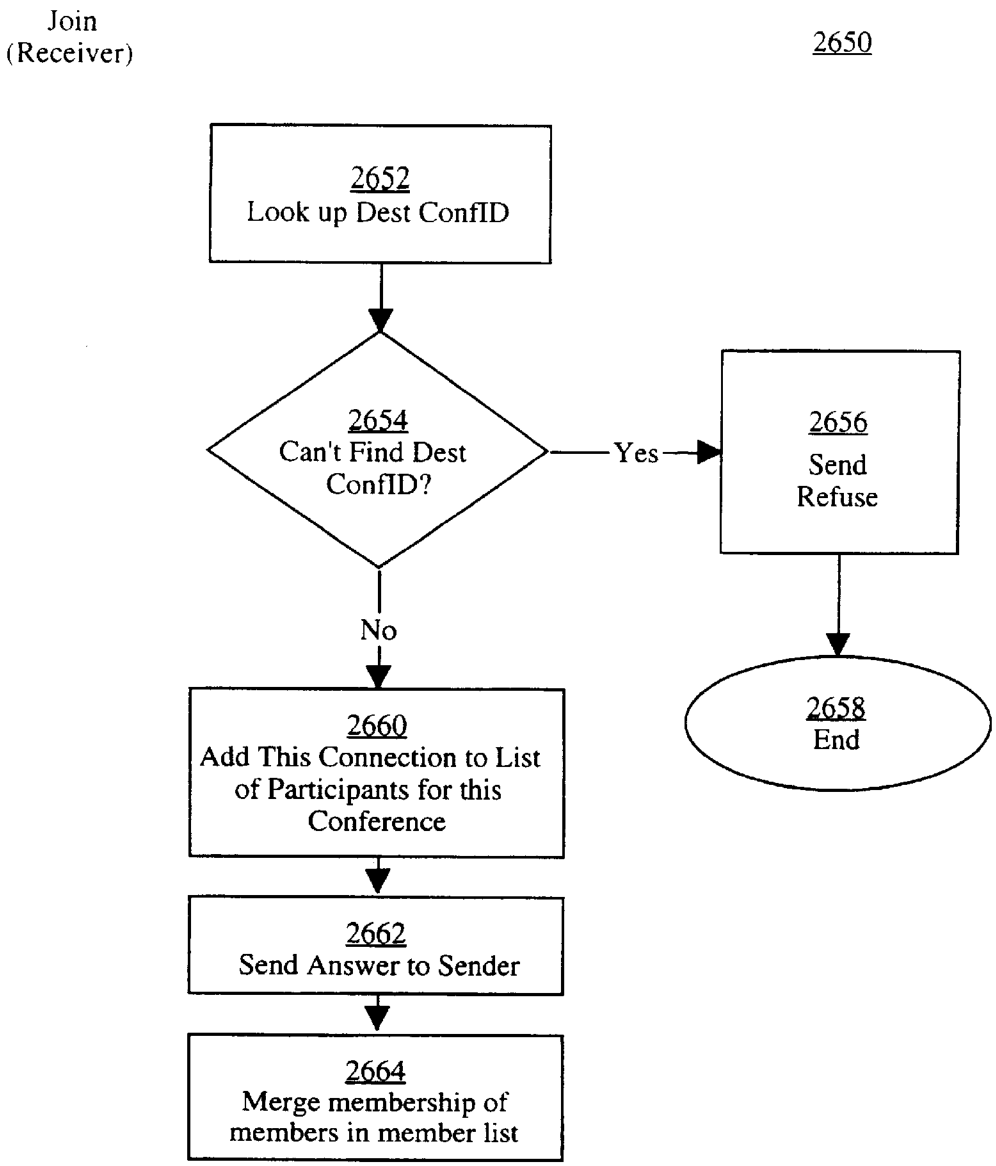

Join operations have the protocol illustrated in FIG. 9. FIGS. 26*a*–26*c* illustrate the process steps performed in a transmitter and receiver during join operations. FIG. 26*a* shows a process 2600 which includes the process steps performed by a transmitter of a join message or any message containing a member list. This may occur, for example, responsive to an auxiliary or merge message. First, the transmitter creates a join message at step 2602. The destination conference ID and calling conference ID's are added to the message at step 2603. Then, at step 2604, a member is appended to the members list in the join message. This is shown in more detail in FIG. 26*b*. A transport level connection with the member to receive the join is then performed at step 2605. Subsequent thereto, the message is then sent to any recipients at step 2606.

FIG. 26*b* illustrates the "append members" function 2604 shown in FIG. 26*a* for appending members to a member list. The function starts at step 2610 which determines whether the member is a "joiner." If so, then additional members can be appended to the join. If not, then the function ends and the join message with the single member is transmitted as shown on FIG. 26*a*. At 2612, the next member is retrieved according to the conference ID. At step 2614 it is determined whether there are any more members in the specified conference ID. If not, the process is complete. If there are more members and the shareable mode flag is set, as detected at step 2616, then the member is added to the member list at step 2618. In this manner, during a merge operation, other participants receiving join messages can determine if conference membership has changed, requiring additional join messages to be transmitted by receiving members.

Figure 29:
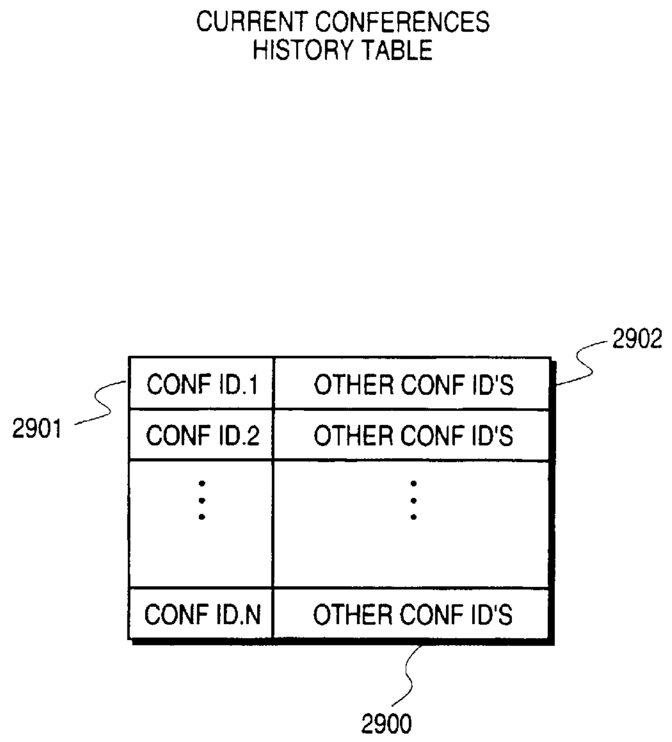
FIG. 29 shows an example of a merged conferences table within a single participant.

FIG. 26*c* shows the steps performed by a receiver of a join message. First, at step 2652, the destination conference ID contained in the join message is looked up by the receiver in a locally-stored current conferences history table (e.g. 2900 of FIG. 29). This keeps track of previously used conference ID's for any currently active conferences. If the conference ID has changed, the member can then complete the join by referencing an old conference ID and the current conference ID in the member. This allows for conference merge and auxiliary messages from widely distributed members in a network. If the conference ID can't be found, as detected at step 2654, then the connection is refused at step 2656, by the issuance of an appropriate response message, and the join fails. If the conference ID has been found, then, at step 2660, the connection is added to the list of participants for the conference. At step 2662, a Response message that the join can be performed is sent to the sender of the join. Then, the membership of the members contained in the member list of the join can then be performed as shown in FIG. 26*d*.

Figure 26D:
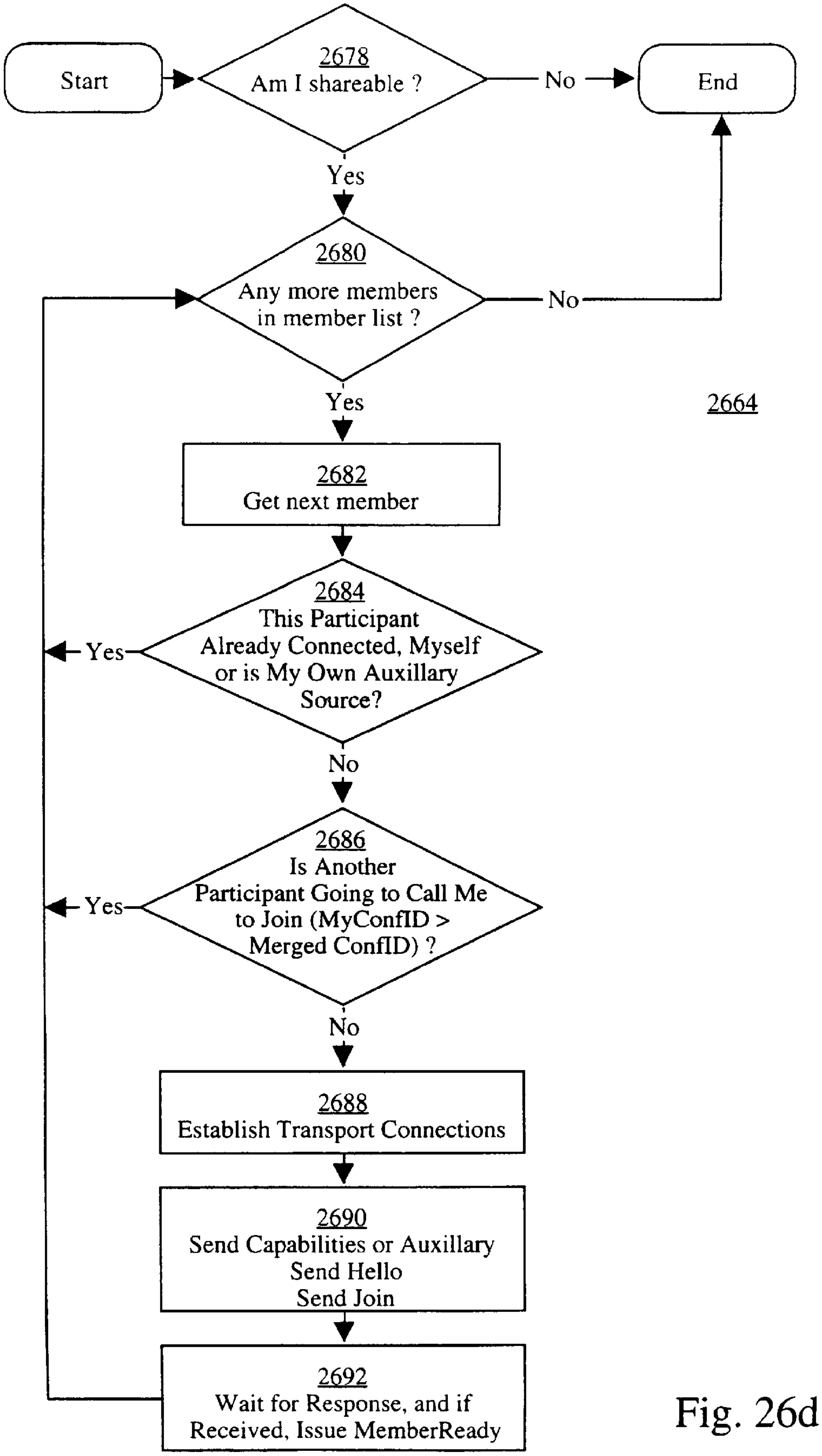
Figure 27A:
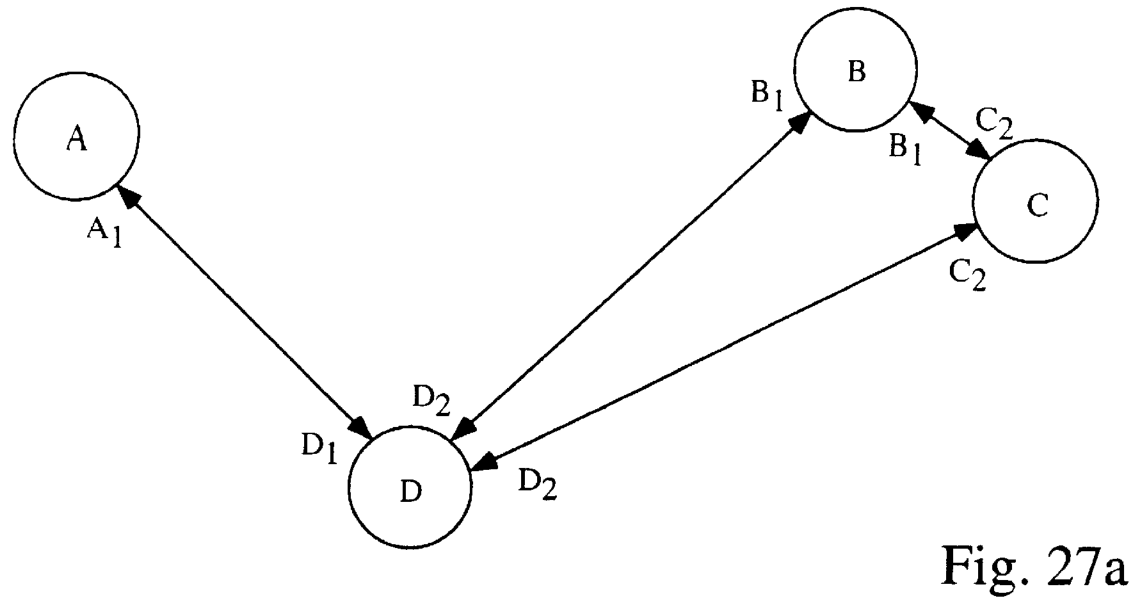
FIGS. 27*a* and 27*b* show the conferences before and after a merge operation between teleconferences.
Figure 27B:
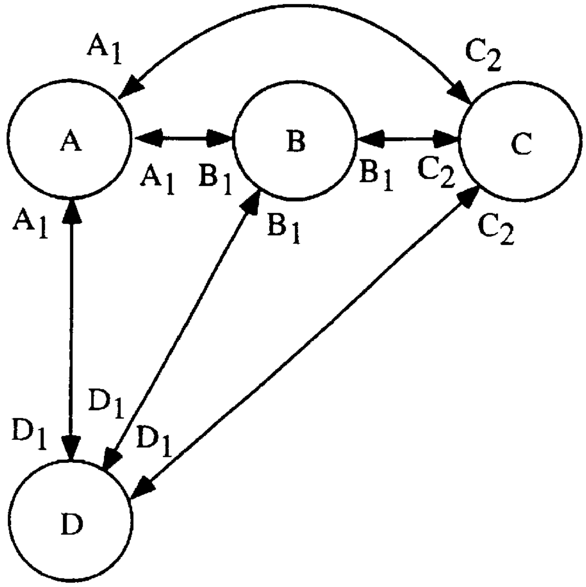

The merge membership function 2664 is shown in more detail in FIG. 26*d*. First, it is determined at step 2678 whether the member merging membership is shareable. If so, then at step 2680, it is determined whether there are any more members in the member list. If not, the function is complete. If so, the next member from the membership list is retrieved at step 2682. If the participant is already connected, is the member or is the member's own auxiliary source, as detected at step 2684 then the process returns to step 2680. It is determined, at step 2686, whether this party is going to initiate the join with this member in the member list. This prevents conflicting join messages from being received and acted upon in the network. This is accomplished by determining whether the recipient's conference ID is greater than the calling party's conference ID. In this case, this party will take action on the join (e.g. place the call to the other party to accomplish the join). Operations necessary to accomplish the join then take place starting at step 2688. At this step, transport level connections are established. Once established, capabilities, if any, (or an auxiliary message, in the case of an auxiliary source), hello, and join messages are sent at step 2690. The member then waits for a response to the join, and if received in the affirmative, the conference component issues MemberReady to the application. This process continues until all members in the member list have been processed.

Merge Operations

Merge operations are initiated using a "Merge" message (e.g., 1900 of FIG. 19) which indicates to a participant that two existing conferences should be merged. This is according to the conference ID contained within the field 1908 of Message 1900. Each Merge message contains within it a memberList 1912 which allows the participating members to transmit Join messages to all the members which have been listed in the memberList. This further allows changing membership and conference ID during the course of a merge operation to be tracked so that correct conference ID's and conference membership may be maintained until after the merge. A merge operation is graphically illustrated with reference to FIGS. 26*a* and 26*b*. For example, at a first time period as illustrated in FIG. 26*a*, conference member ID may be engaging in two conferences denoted 1 and 2 with several other members, A, B, and C. The member then proceeds to issue Merge messages to the members of conferences. That is, member D issues join messages to members A, B and C to Merge the conference 2 (denoted $B_1$ and $C_1$). At the end of the operation, members A, B, C, and D all have point-to-point communication channels and the new conference ID is the same, ($A_1$, $B_1$, $C_2$, $D_1$, respectively in each of the members). The mechanics of this operation are described briefly with reference to FIGS. 28*a*–28*b*. That is, the two separate conferences are now denoted by the same conference ID's in each of the members.

Figure 28A:
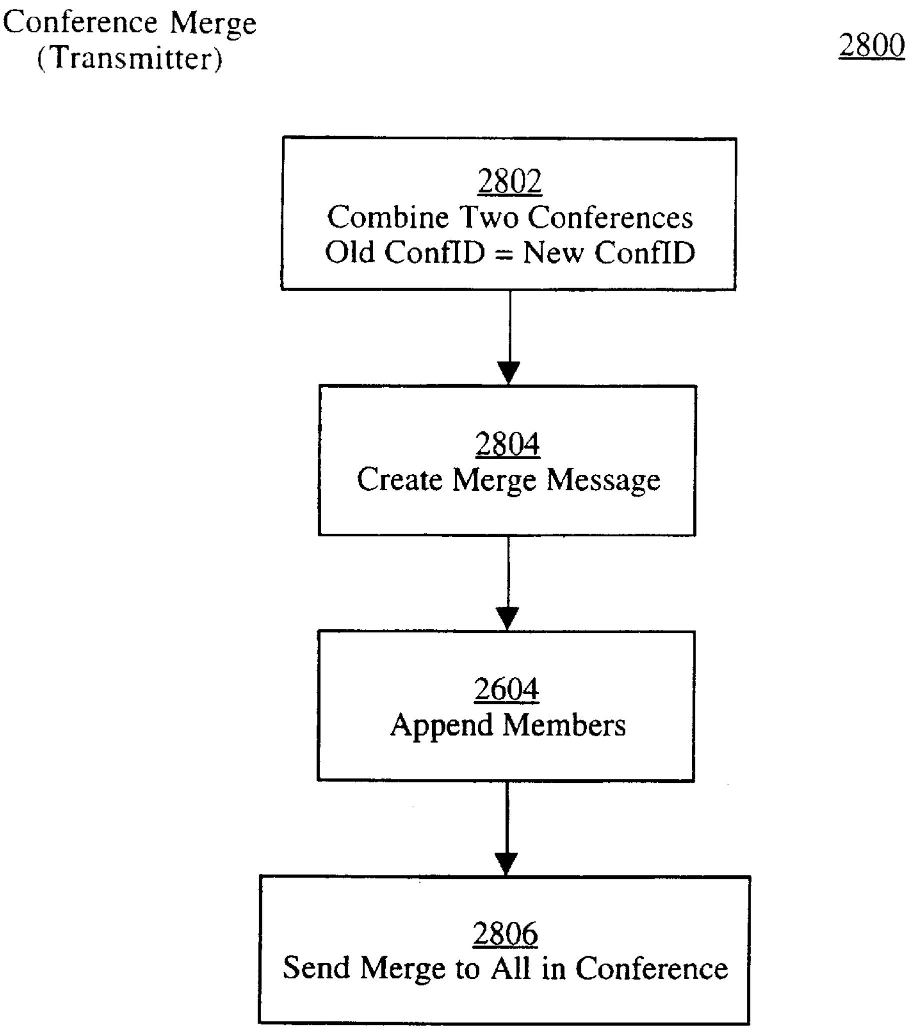
FIGS. 28*a–b* show a sequence of steps performed by the conference component during a merge operation.
Figure 28B:
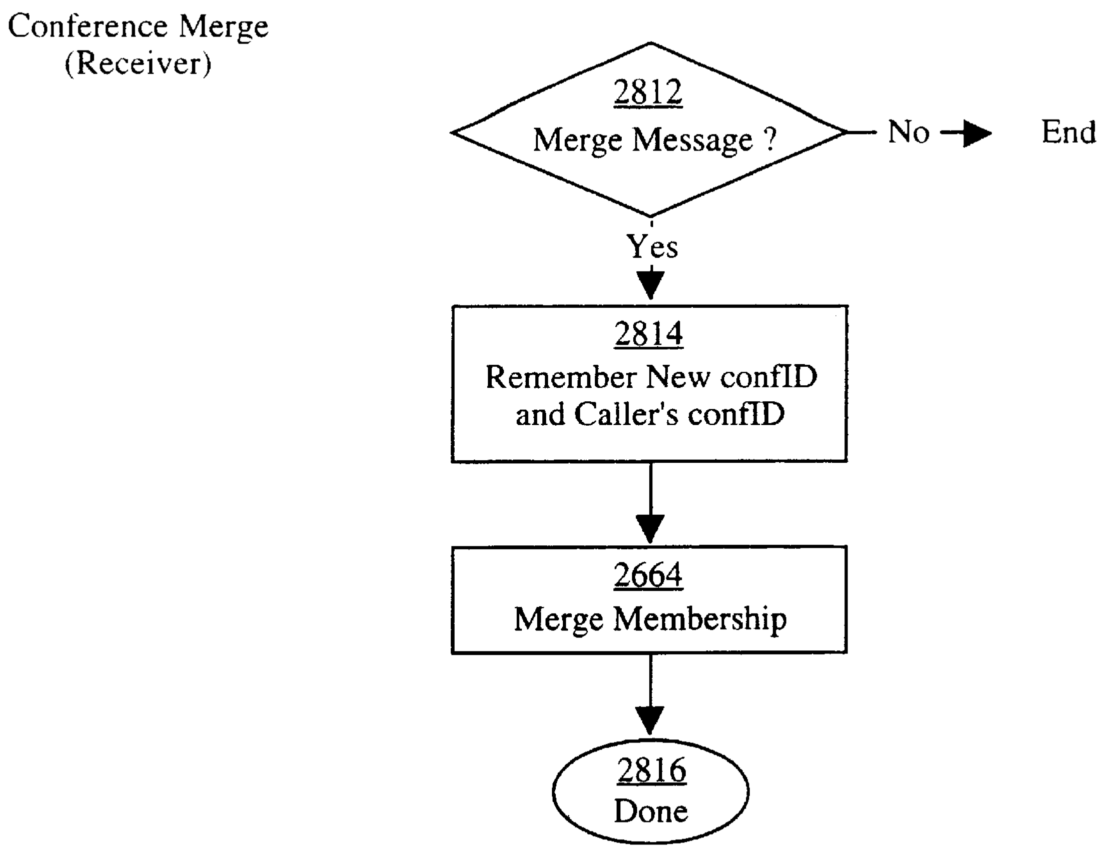

FIGS. 28*a*–28*b* show the steps taken during a merge operation by the conference component in the transmitter and receivers (if any) of a merge message. FIG. 28*a* shows the process steps taken by a transmitter of a merge request. The member first combines the conference ID's of the old and new conference in it's internal store at step 2802. Then, at step 2804, the member creates the merge message and appends each of the members of the conference to the members list in the message via the append members routine 2604 (discussed above) in order to ensure full connectivity among all conference members. Then, at step 2806, the merge message is sent to all participants in the merge.

FIG. 28*b* shows process steps taken in a receiver receiving a merge message. Once a merge message has been detected (step 2812), the merge recipient recalls in a local store for example, the conference name and the conference ID at step 2814. Then, as discussed with reference to FIG. 26*d*, above, a merger of membership is performed (e.g. process 2664), and the process is thus complete at step 2816.

In addition to using conference ID's for performing merge and subsequent join operations, contained within each Merge and Join message is a list of members of the conferences being merged or joined. These are included in the memberList fields 1812 or 1912 of messages 1800 or 1900. For example, due to propagation delays in a networking system, old conference ID's may still exist in peripheral participants, and therefore during merging and or joining operations, conference ID's may become invalid due to members merging conferences, etc. . . . , or reference conference ID's which no longer exist. Thus, contained within each conference component in a member is a current conferences table such as 2900 shown in FIG. 29. The current conferences history table allows a member performing a merge or join operation to determine whether in fact conferences to be merged use old conference ID's. If so, then the new conference ID may be used to transmit to the participants receiving the join messages, and/or be matched to the appropriate conference ID. Thus, the member performing the merge operation can reference by way of the current conference ID 2901 contained within the merged conferences table, or other conference ID values 2902, containing a variable length list of conference ID's, to which the current conference ID refers. Conference entries are deleted at the end of a conference by the conference component. If a merge occurs at a peripheral location and a conference ID becomes invalid, then the list of conference ID's for an existing conference ID can be referenced by referencing the merged conferences history table.

Multicast

Figure 30A:
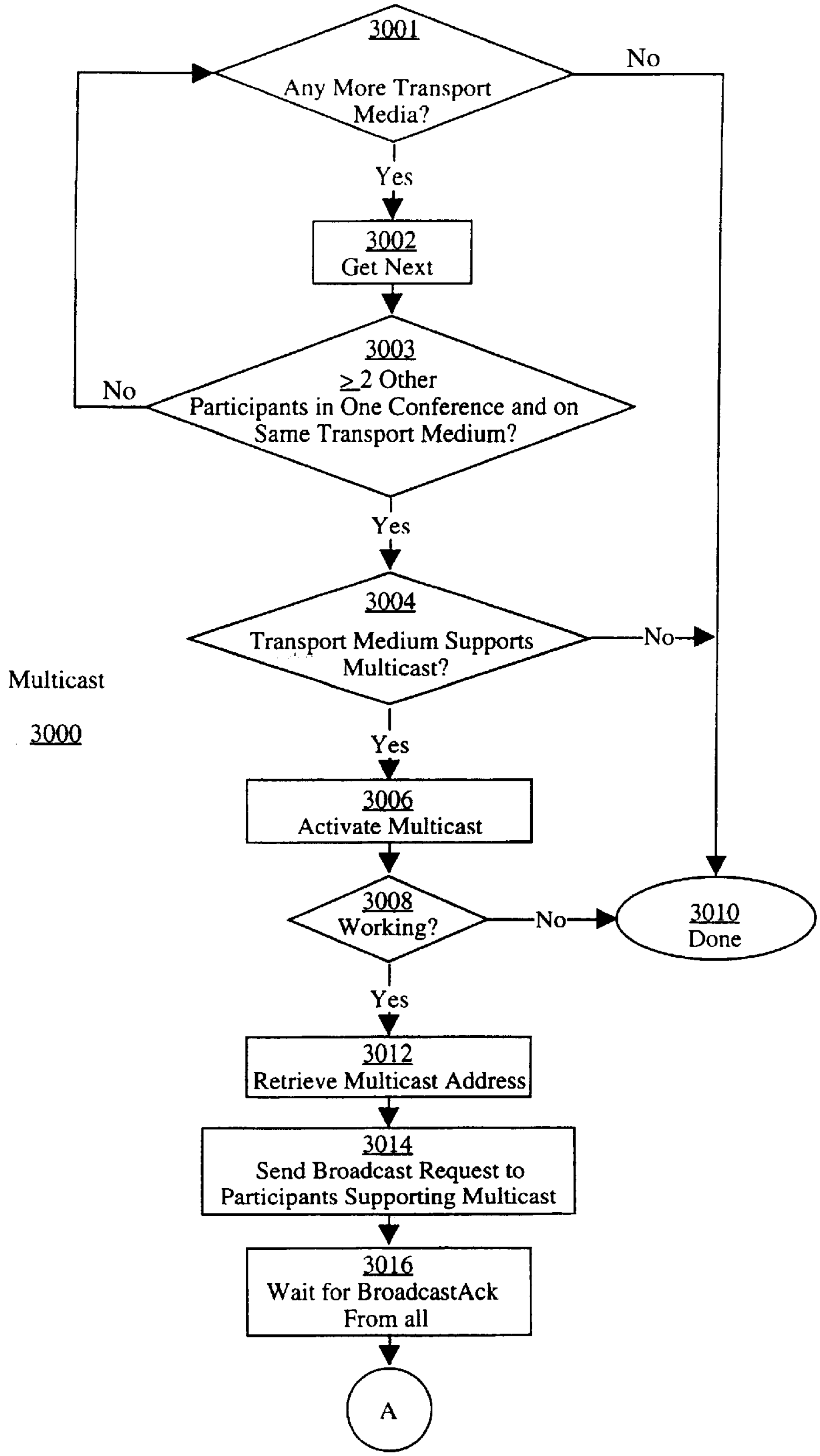
FIGS. 30*a*–30*b* shows a sequence of steps performed for converting point to point connections to multicast connections for a teleconference.
Figure 30B:
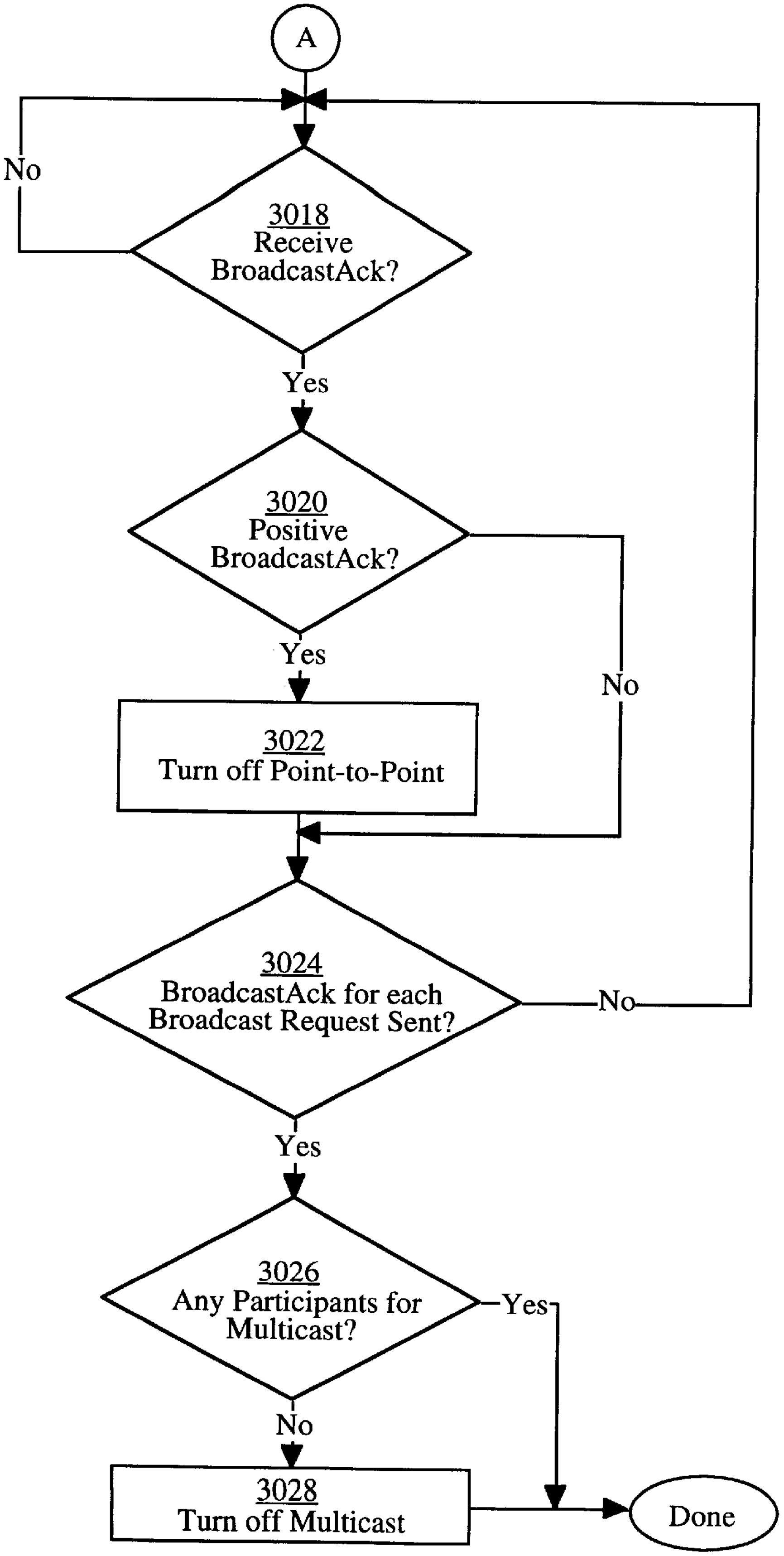

FIGS. 30*a* and 30*b* illustrate a process which is performed as an optimization if multiple participants within a conference support multicast address broadcast capabilities. First, it is detected at step 3001 whether there are any more transport media to be examined. If so, then the next is retrieved at step 3002, and at step 3003 it is determined whether two or more participants are in the same conference and are on the same transport medium. If so, and the transport medium supports multicast at step 3004, then the multicast capabilities of the transport medium are activated at step 3006. If so, and the multicast capabilities are working at step 3008, then step 3008 proceeds to step 3012. If it is not working, as detected at step 3008, then the process is aborted at step 3010. At step 3012 a multicast address which may be used for the transport medium is retrieved at step 3012. Then, at 3014, Broadcast Requests are sent in substantially the format as shown in Message 2400 of FIG. 24, to all the participants detected at step 3002 supporting multicast. The process then awaits BroadcastAck (in the format 2500 shown in FIG. 25) in order to determine whether the multicast address is available for each at step 3016. If so, then for each BroadcastAck determined to be received at step 3018, and it is determined whether the BroadcastAck was positive (due to the response value contained in field 2508 of FIG. 25). At step 3022, if the response was positive, then the point-to-point connection is deactivated. Once all the Broadcast Acks have been received (or have timed-out), then it is determined at step 3024 whether there was a Broadcast Ack received for each Broadcast Request message sent. If not, then the process is complete. If so, however, step 3026 determines whether there were any positive BroadcastAck for the multicast. If not, then multicast is deactivated, and point-to-point communication continues to be used for communication with the other members (this optimization cannot be performed). The process is thus complete.

Auxiliary Operations

Figure 31:
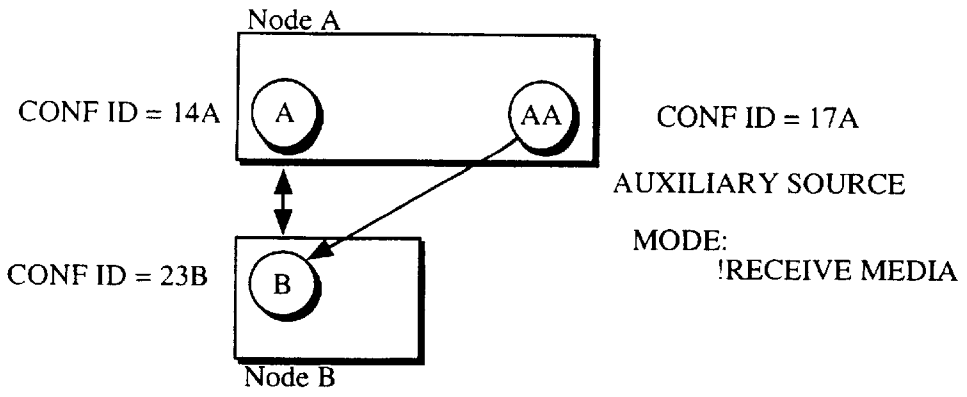
FIGS. 31 and 32 show the adding of an auxiliary source and the messages during the adding of the source to an existing teleconference.
Figure 32:
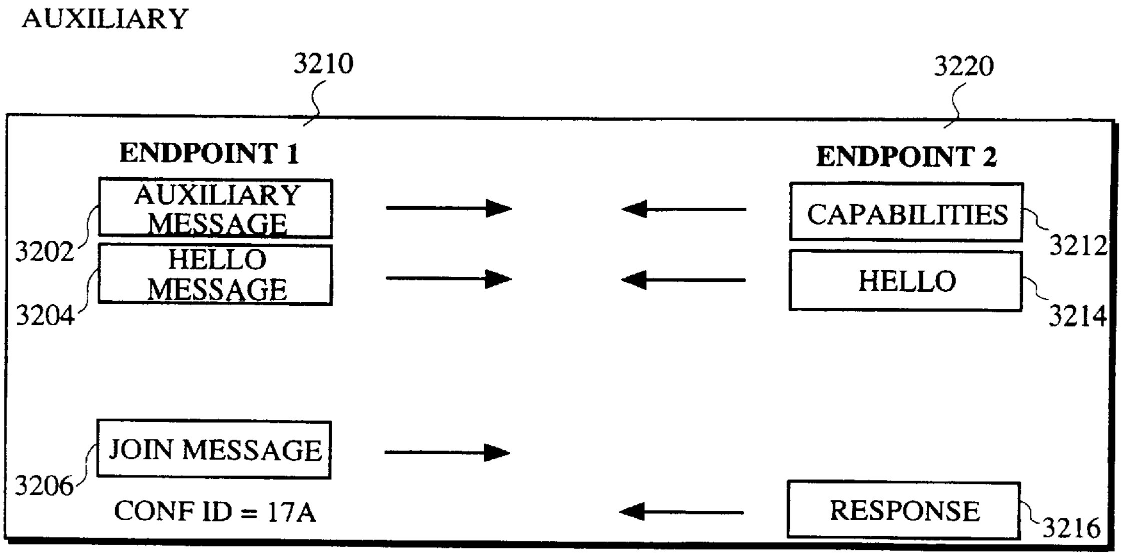

An auxiliary media source can become part of an ongoing conference. The media source is associated with an ongoing conference by a invoking reference to the main conference stored in each conference component (e.g. by the API call MTConferenceAttachAuxiliarySource), however, it is treated as a separate conference in each conference component. For example, as illustrated with reference to FIG. 31, a first conference referred to by conference ID 23B in member B, may be notified of an auxiliary source having conference ID 17A from member A. Note that similar to the protocol illustrated with reference to the Capabilities and Hello messages in FIGS. 8 and 9 above, the Auxiliary message may be sent in place of a Capabilities message between a first endpoint and a second endpoint as illustrated in FIG. 32. The timing of the messages is illustrated with reference to FIG. 32. Similar to the capability and call protocol illustrated with reference to FIG. 8 above, the Auxiliary message 3202 is received from the first endpoint 3210, to notify endpoint 2 3220 that an auxiliary source is available from the parent conference ID, as specified in parentConfID field 1704 of Auxiliary message 1700 of FIG. 17. Then, a Hello message 3204 is transmitted from endpoint 1 3210 to endpoint 2 3220. Responsive thereto, endpoint 2 3220 transmits capabilities message 3222 and Hello message 3224. Subsequent thereto, a Join message 3226 with the conference ID=23B is issued from the endpoint to 3220 with the conference ID of the source in order to indicate that the endpoint 3220 wishes to receive the auxiliary source AA, shown in FIG. 31. Subsequent thereto, all messages from source A to recipient B as illustrated in FIG. 31 reference the same conference ID 23B for the ongoing conference between A and B. As illustrated in FIG. 31, the "receive media" mode flag is set to not receive (!Receive) and furthermore, the mode of the auxiliary source is not joiner (!Joiner) since it is a receive-only media source. Subsequent thereto, the second endpoint 3220 sends a response message 3216 indicating that the auxiliary source has been successfully joined with the conference 23B. Subsequent thereto, both media messages for the conference ID 23B, and the auxiliary source having conference ID 17A are treated as from the same source (A) by the application. The details and mechanics of a member receiving an auxiliary source message are illustrated with reference to FIGS. 33 and 34.

Figure 33:
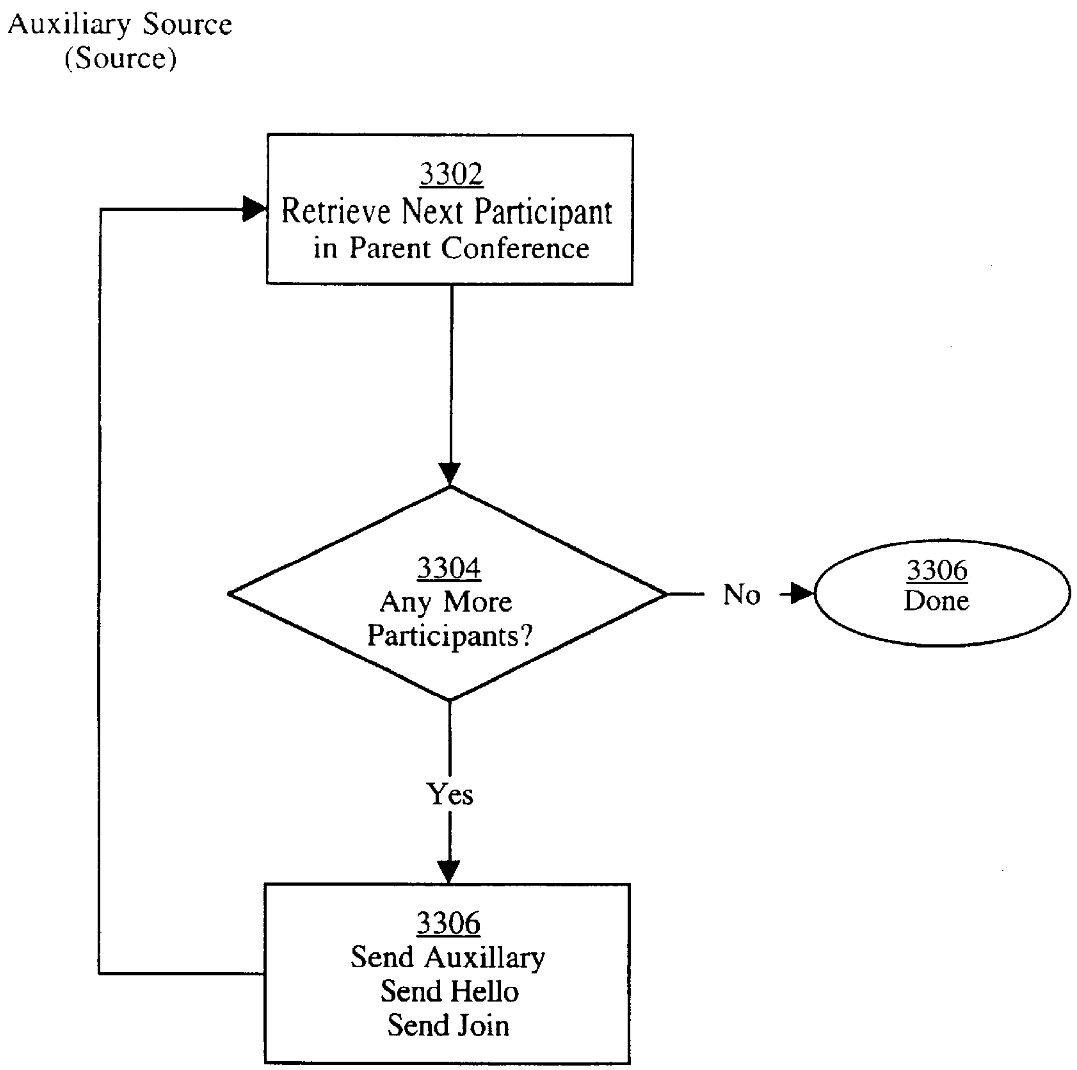
FIGS. 33–34 show the details of a sequence of steps performed within a participant for adding an auxiliary source.

FIG. 33 shows the process steps performed within a source of an auxiliary source. At step 3302, the next participant in the conference to which the auxiliary source will be attached is retrieved. It is determined, at step 3304, whether there are any more participants in the conference to which the auxiliary source will be attached. If any, then, at step 3306, auxiliary, hello and join messages are sent to the participant. If accepted via a positive response message (as shown in FIG. 32), the auxiliary then becomes available to the participant for the receiver of the message. The process continues until step 3304 determines that no additional participants in the conference should join in to monitoring of the auxiliary.

Figure 34:
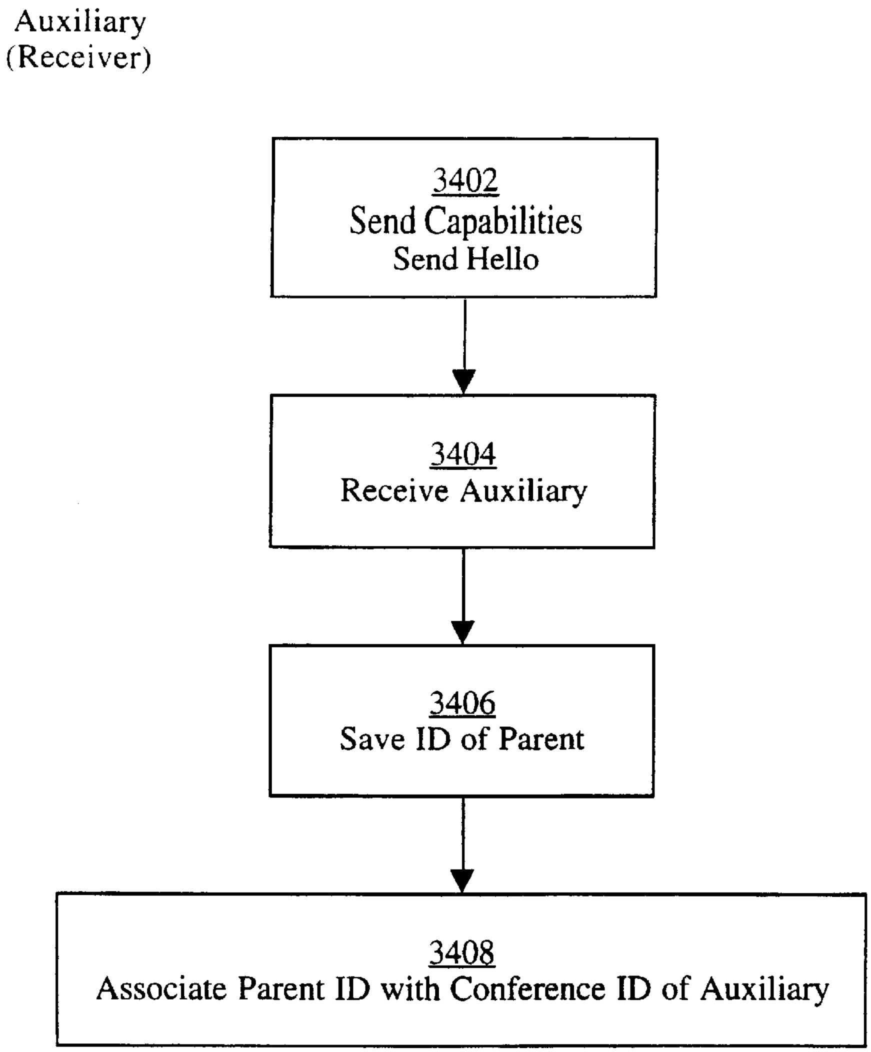

FIG. 34 shows the steps taken by a receiver upon receipt of the initial auxiliary message. At step 3402, capabilities (if any), and hello are sent. At step 3404, the auxiliary source media starts to be received, and the conf ID of the parent conference is saved in the conference component of the receiver at step 3406. This allows the application to determine that the auxiliary is associated with the parent media source by storage in the conference component for later retrieval at step 3408. If the auxiliary is received prior to the receipt of a join message, then the association of the auxiliary with the parent conf ID allows the later association of the two from the application's standpoint.

Figure 35A:
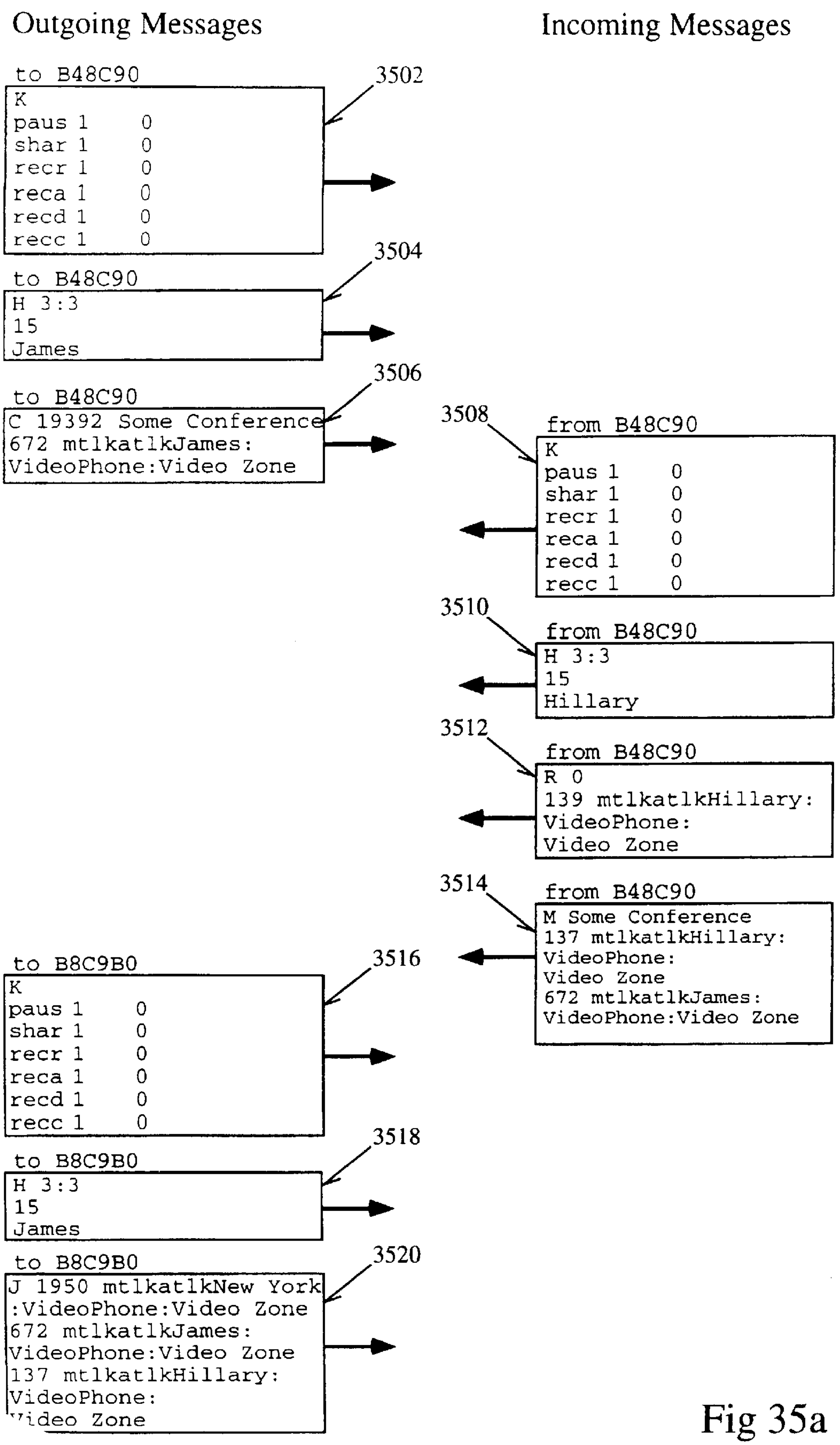
FIGS. 35*a*–35*b* show an example sequence of messages which are sent between a first endpoint and a plurality of other endpoints in a networking system, and showing various messages transmitted therebetween.
Figure 35B:
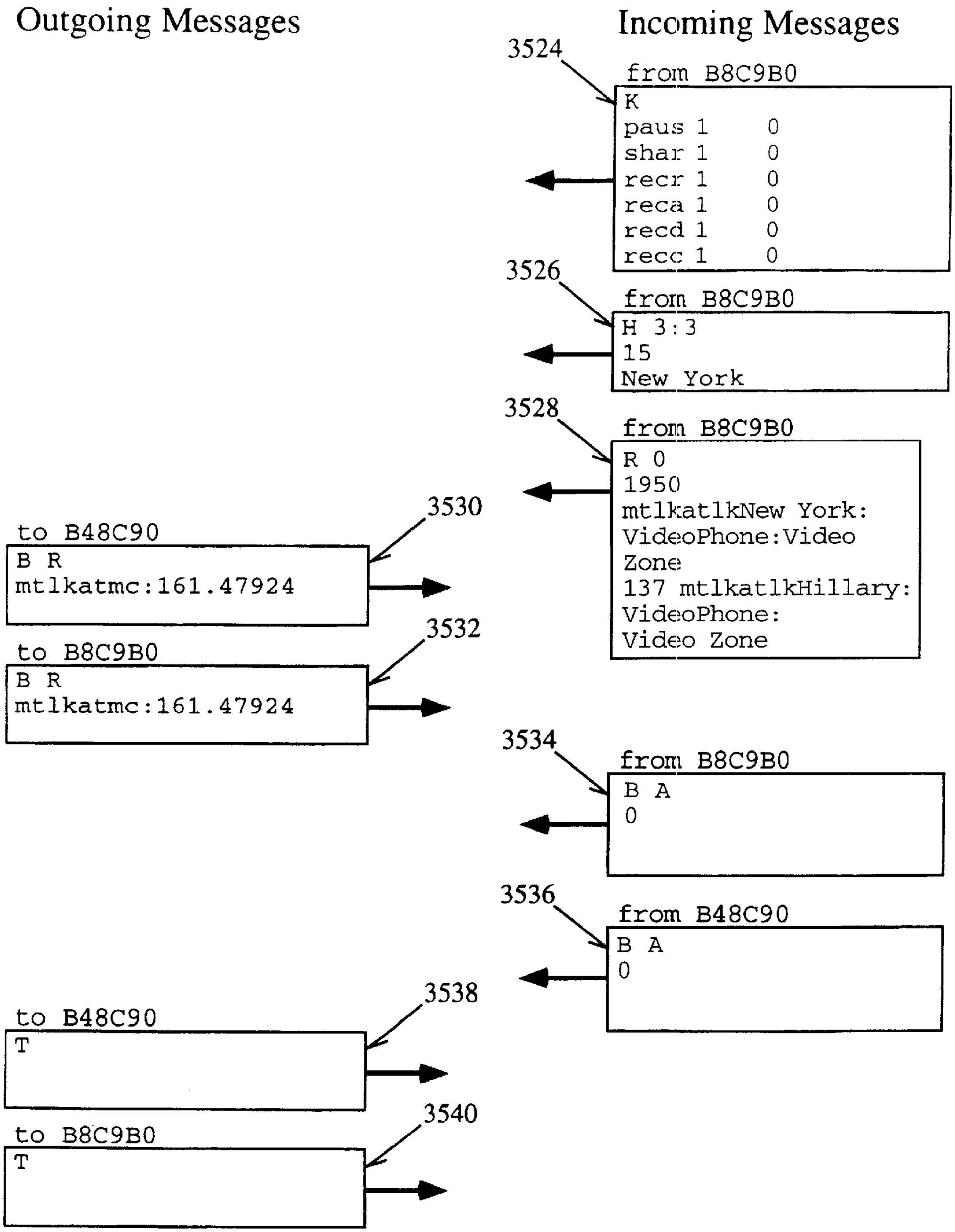

An Example Session (FIGS. 35*a* and 35*b*)

An example session using the protocols described above is shown in FIGS. 35*a* and 35*b*. The figures illustrate the flow of messages, from the view of a first endpoint. After establishment of the connection between the stations using the transport component, the originating station sends capabilities message 3502, and hello message 3504, specifying the calling station's name "James Watt" with the mode mask set to 15 (all bits set—send, receive, joiner, shareable). Then, a call message 3506 is transmitted to the receiver along with the timeout value=19392 confname="some conference," and the confID="672 mtlkatlkJamesWatt: VideoPhone: VideoZone". Simultaneously with the establishment of the connect, corresponding capabilities, hello, and response are sent from the station entitled "Hillary Rodham" as illustrated by packets 3508–3512, having the same mode.

Subsequent to the exchange of capabilities, hello, and call and response, a merge message 3514 is received by the first endpoint including the conference name "Some Conference", a conf ID=137 "mtlkatlk Hillary Rodham: Video Phone: Video Zone" and a member list. The endpoint then processes the merge, placing a call sending capabilities, and hello to a member of the old conference, and a join along with the member list as shown by messages 3516, 3518, and 3520. Once the connection has been established, capabilities and hello messages 3524 and 3526 are received from the recipient. Responsive to the join the recipient sends a response message 3528 with the result=0 (request successful). Subsequent thereto, the endpoint then attempts to use a multicast address by transmitting broadcast request messages 3530 and 3532. The other members respond with broadcast Acks 3534 and 3536, allowing the use of multicast. The conference can then be terminated at any time by any of the members via the transmission of terminate messages to all of the members, such as 3538 and 3540.

Thus, by use of the foregoing, connections between endpoints, such as for teleconferences between teleconferencing systems, can be enabled. This includes, but is not limited to, the exchange of capabilities and notification of connections between endpoints, the addition of auxiliary data streams to such connections, and the merging of existing connections. It will be appreciated that though the foregoing has been described especially with reference to FIGS. 1–35*b*, that many modifications made be made, by one skilled in the art, without departing from the scope of the invention as described here. The invention is thus to be viewed as limited only by the appended claims which follow.

What is claimed is:

1. In a system wherein a first endpoint is providing data to a plurality of second endpoints each connected by a point-to-point communication channel with said first endpoint, an automatic method for optimizing the transmission of said data to said plurality of second endpoints comprising the following steps:

a. said first endpoint activating a multicast communication channel having a first multicast address and commencing broadcast of said data over said multicast communication channel;

b. Said first endpoint transmitting a request message to each of said plurality of second endpoints in order to query each of said second endpoints whether they can receive transmissions broadcast to said first multicast address;

c. certain of said plurality of second endpoints transmitting an acknowledgment message and said first endpoint receiving said acknowledgment message;

d. for each said acknowledgment message received from said certain of said plurality of second endpoints which indicates that said certain of said plurality of second endpoints can receive transmissions broadcast to said first multicast address, deactivating said point-to-point communication channel with said first endpoint and said certain of said plurality of second endpoints; and e. terminating said broadcast of said data and said multicast communication channel if at least two of said plurality of second endpoints do not transmit said acknowledgment messages containing a positive acknowledgment.

2. The method of claim 1 further comprising the step of receiving detach messages from certain of said plurality of second endpoints, and if at least two of said plurality of second endpoints are not receiving said data, then terminating said broadcast of said data and said multicast communication channel.

3. The method of claim 1 wherein said each acknowledgment message includes a response code.

4. The method of claim 3 wherein said response code indicates whether each said certain of said plurality of second endpoints can receive transmissions broadcast to said first multicast address.

5. The method of claim 1 wherein said data includes teleconference data.

6. The method of claim 1 further comprising, prior to said step of said first endpoint activating said multicast communication channel having a first multicast address, determining whether more than one of said plurality of second endpoints is coupled to said first endpoint on a single communication medium, and if not, aborting said method.

7. The method of claim 6 further comprising, prior to said first endpoint activating said multicast communication channel having said first multicast address, determining whether said single communication medium supports broadcasting to said first multicast address.

8. The method of claim 1 wherein said data includes teleconference data between said first endpoint and said plurality of second endpoints.

9. An apparatus in a first endpoint for transmitting data to a plurality of second endpoints receiving said data from said first endpoint on point-to-point communication channels comprising:

a. a circuit for activating a multicast communication channel having a first multicast address and commencing broadcast of said data over said multicast communication channel;

b. a circuit for transmitting a request message to each of said plurality of second endpoints in order to query each of said second endpoints whether they can receive transmissions broadcast to said first multicast address;

c. a circuit for receiving acknowledgment messages, if any, from certain of said plurality of second endpoints;

d. a circuit for deactivating each said point-to-point communication channel with said certain of said plurality of second endpoints responsive to receiving each said acknowledgment message; and e. a circuit for terminating said broadcast of said data and said multicast communication channel if at least two of said acknowledgment messages containing a positive acknowledgment are not received.

10. The apparatus of claim 9 further comprising a circuit for receiving detach messages from others of said plurality of second endpoints, and if at least two of said plurality of second endpoints are not receiving said data, then terminating said broadcast of said data and said multicast communication channel.

11. The apparatus of claim 9 wherein said each acknowledgment message includes a response code.

12. The apparatus of claim 11 wherein said response code indicates whether each of said certain of said plurality of second endpoints can receive transmissions broadcast to said first multicast address.

13. The apparatus of claim 9 wherein said data includes teleconference data.

14. The apparatus of claim 9 further comprising a detection circuit operative prior to said first endpoint activating said multicast communication channel having said first multicast address for determining whether more than one of said plurality of second endpoints is coupled to said first endpoint on a single communication medium, and if not, not activating said circuits b and c.

15. The apparatus of claim 14 further comprising, prior to activation of said detection circuit a circuit for determining whether said single communication medium supports broadcasting to said first multicast address.

* * * * *